(12) United States Patent
Dispensa et al.

(10) Patent No.: US 7,002,937 B1
(45) Date of Patent: Feb. 21, 2006

(54) ACCESS BASED ON TERMINATION IN A WIRELESS COMMUNICATION SYSTEM

(75) Inventors: Steve Dispensa, Shawnee Mission, KS (US); Jason M. Sloderbeck, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 910 days.

(21) Appl. No.: 09/981,173

(22) Filed: Oct. 17, 2001

Related U.S. Application Data

(60) Provisional application No. 60/241,048, filed on Oct. 17, 2000.

(51) Int. Cl.
*H04J 3/16* (2006.01)

(52) U.S. Cl. .................................................. 370/329
(58) Field of Classification Search ............... 370/328, 370/329, 462
See application file for complete search history.

(56) References Cited

U.S. PATENT DOCUMENTS

| | | | |
|---|---|---|---|
| 5,347,304 A | 9/1994 | Moura et al. | |
| 5,586,121 A | 12/1996 | Moura et al. | |
| RE35,774 E | 4/1998 | Moura et al. | |
| 5,818,845 A | 10/1998 | Moura et al. | |
| 5,828,655 A | 10/1998 | Moura et al. | |
| 5,859,852 A | 1/1999 | Moura et al. | |
| 5,946,322 A | 8/1999 | Moura et al. | |
| 5,956,346 A | 9/1999 | Levan | |
| 5,959,660 A | 9/1999 | Levan | |
| 5,959,997 A | 9/1999 | Moura et al. | |
| 6,005,850 A | 12/1999 | Moura et al. | |
| 6,016,316 A | 1/2000 | Moura et al. | |
| 6,104,727 A | 8/2000 | Moura et al. | |
| 6,683,860 B1 * | 1/2004 | Forssell et al. | ............. 370/329 |
| 6,718,179 B1 * | 4/2004 | Forssell et al. | ............. 455/509 |
| 6,721,278 B1 * | 4/2004 | Rimhagen et al. | .......... 370/252 |
| 2002/0036985 A1 * | 3/2002 | Jonas et al. | ................. 370/235 |
| 2002/0052205 A1 * | 5/2002 | Belostotsky et al. | ........ 455/452 |

OTHER PUBLICATIONS

Dawson, Fred, "Broadband Wireless for Biz: Rumblings," Infrastructure Moves Suggest Rollouts Nearing, Adaptive Broadband Corp. Network Solutions pp. 52-66 Oct. 2000.

* cited by examiner

*Primary Examiner*—Min Jung

(57) ABSTRACT

A wireless control system uses wireless communications that include a plurality of channels and that are shared between a plurality of wireless communication devices. The wireless control system generates and transmits a first control message that allows first access to one of the channels for one of the wireless communication devices. The wireless control system receives a termination message indicating termination of the first access. The wireless control system processes the termination message to determine an amount of time for a second access to the one of the channels for the one of the wireless communication devices. The wireless control system then generates and transmits a second control message that allows the second access and indicates the amount of time. In other embodiments, the termination message indicates a number of packets or bytes remaining to be transmitted.

42 Claims, 14 Drawing Sheets

| CUSTOMER ID | WBR ID | TYPE OF CUSTOMER | TIME OF DAY | RATE OF CREDIT TRANSMISSION | COLLISION RATE | THRESHOLD FOR COLLISION RATE |
|---|---|---|---|---|---|---|
| 800012 | 154 | HOME | DAYTIME | 1 CREDIT/ 50MS | .50 % | 2 % |
| 800012 | 154 | HOME | NIGHTTIME | 1 CREDIT/ 40MS | .50 % | 1 % |
| 800013 | 155 | BUSINESS | DAYTIME | 1 CREDIT/ 30MS | .50 % | .5 % |
| 800013 | 155 | BUSINESS | NIGHTTIME | 1 CREDIT/ 50MS | .50 % | 2 % |
| 800014 | 156 | HOME | DAYTIME | 1 CREDIT/ 50MS | .50 % | 2 % |
| 800014 | 156 | HOME | NIGHTTIME | 1 CREDIT/ 40MS | .50 % | 1 % |

FIG. 12

ACCESS BASED ON TERMINATION IN A WIRELESS COMMUNICATION SYSTEM

RELATED APPLICATIONS

This application claims the benefit of provisional application 60/241,048 filed Oct. 17, 2000, which hereby is incorporated by reference into this application.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to a wireless communication system that determines access to wireless communications.

2. Description of the Prior Art

People and businesses are demanding higher bandwidths from their communication providers. Consequently, the communication providers are looking for ways to increase the bandwidth of their systems using broadband technologies. Broadband technologies are generally referred to as systems that deliver a bandwidth at or above 64 kbps. Broadband technologies can communicate over downstream channels and upstream channels. The customer receives data from another device or system over the downstream channels. The customer transmits data to another device or system over the upstream channels.

Broadband Wireline Systems

One example of a broadband technology is Digital Subscriber Line (DSL) service. DSL service can carry both voice signals and data signals at the same time in both directions. DSL service also can carry call information and customer data. DSL service is typically comprised of twisted-pair wires that connect a customer to a central office. The central office comprises a Digital Subscriber Line Access Multiplexer (DSLAM) that provides the DSL service to the customer. Unfortunately, the speed of DSL service is limited by the distance between the customer and the DSLAM. Customers located too far from the DSLAM may not be able to receive high-speed service. Also, there may not be enough customers within a particular area to make it economical to install a DSLAM. The quality of DSL service is also limited by the quality of the copper wire that connects the customer to the DSLAM. Furthermore, DSL service does not work over Digital Loop Carrier (DLC) lines.

Another broadband technology is cable modem service. The cable modem communicates with a device or system over a coaxial cable. The coaxial cable is typically the same coaxial cable used to receive cable television. The cable modem service can be one-way or two-way. In a two-way system, the coaxial cable carries both the upstream channels and the downstream channels. In a one-way system, the cable modem receives data on the downstream channels over the coaxial cable and transmits data on the upstream channels over a phone line. Unfortunately, the cable modem uses up valuable bandwidth on the phone line in the one-way system. Also, the upstream bandwidth is small over a phone line.

Broadband Wireless Systems

Another broadband technology is broadband wireless service. Customers that subscribe to broadband wireless service communicate with a head end. In a one-way wireless system, a transmitter antenna for the head end broadcasts wireless signals to the customer on the downstream channels. The transmitter antenna is a satellite antenna or a land-based antenna. The customer transmits data to the head end over another medium, such as a phone line or a cable modem, on the upstream channels. One example of a one-way wireless system is a Digital Satellite System (DSS) from DIRECTV.

A specific type of broadband wireless system communicates over Multichannel Multipoint Distribution Service (MMDS) frequencies and Multipoint Distribution Service (MDS) frequencies. The MMDS frequencies range from 2596 MHz to 2644 MHz. The MDS frequencies range from 2150 MHz to 2162 MHz. In a typical MMDS system, the bandwidth of the upstream channels is about 6 MHz. The upstream bandwidth is divided into subchannels. Each subchannel has a bandwidth of 200 kHz.

A head end manages the upstream and downstream channels with the customer. The head end also interfaces the customer with communication systems such as the Internet. The head end includes a base antenna comprised of a transmitter antenna and one or more receiver antennas. MMDS requires a line of sight between devices that are communicating. Therefore, the antennas are placed on a high building or a mountain to establish lines of sight with the customers.

The transmitter antenna is omni-directional and broadcasts data from the head end to the customers on the downstream channels. In a two-way wireless system, the receiver antennas are positioned to receive MMDS signals transmitted from customers to the head end on the upstream channels. Each receiver antenna is positioned to receive MMDS signals from customers located within a certain area. The areas formed by the antennas are referred to as sectors. The sectors have designated frequency ranges or designated channels.

The head end is comprised of an upstream manager and a downstream manager that control transmissions on the upstream channels and the downstream channels, respectively. As stated above, the upstream channels and the downstream channels are divided into subchannels. One upstream subchannel is a contention channel reserved for signaling, while the remaining subchannels are bearer channels.

In the broadband wireless system, a wireless broadband router is located at a customer premises. The wireless broadband router communicates with the upstream manager and the downstream manager to exchange data. The upstream manager generally operates the channels and/or subchannels in four states: idle, contention, polling, and dedicated. In the idle state, the channels are idle. In the contention state, the upstream manager generates and transmits control signals over one or more subchannels.

For the polling and dedicated states, the upstream manager polls numerous wireless broadband routers to allocate use of the subchannels. Polling is a round robin process to determine access to a subchannel. The upstream manager maintains a queue of the active wireless broadband routers to determine which wireless broadband router is next to transmit over a subchannel for a period of time. The upstream manager keeps an inventory of open subchannels and waiting wireless broadband routers in the queue.

The upstream manager uses a credit to grant a wireless broadband router use of a subchannel for a limited period of time. A credit is a message that allows usage of a subchannel for a period of time or for the transfer of a maximum number of transmission units, such as bytes. One example of a credit is information, such as a subchannel or frequency range, a maximum allowed time to transfer data, and a maximum number of bytes the wireless broadband router is allowed to transfer.

There are two kinds of credits: polling and dedicated. Polling credits are credits related to polling of the wireless broadband routers. Polling credits are generally smaller than the dedicated credits. Once the wireless broadband router completes transfer of the packets, the wireless broadband router transmits a DONE message to the upstream manager via the upstream channels. The DONE messages include information such as the number of bytes sent and the number of packets left for the wireless broadband router to transfer. A DONE message is one example of a termination message. The termination message is any signaling, instruction, or message that indicates termination of access for a subchannel or completion of a transfer of information or data. Once the DONE message is received, the upstream manager then transmits another credit. If the DONE message shows that the wireless broadband router has more than three packets left to transfer and there are available subchannels, then the upstream manager issues a dedicated credit to the wireless broadband router.

One problem is the delay from transmitting a credit from the upstream manager to the wireless broadband router to the time the packet is transmitted from the wireless broadband router to the upstream manager. In this example, the delay is 25 ms. The upstream manager determines an open channel and an awaiting wireless broadband router. The upstream manager then transmits the credit with a destination Internet Protocol (IP) address of the awaiting wireless broadband router to the downstream manager. The delay for transmitting the credit from the upstream manager to the downstream manager is approximately 1 ms. The downstream manager performs framing of the credit into a Media Access control protocol, a forward error correction (FEC) function to disperse errors in a packet and interleaving, which in total delays the transmission of the credit by approximately 12 ms. The downstream manager encapsulates the credit in UDP/IP. The downstream manager then transmits the credit to the wireless broadband router. The wireless broadband router then receives the credit, performs FEC, interleaving and queuing on the upstream. The delay of the wireless broadband router is approximately 12 ms.

Thus, the total delay from the upstream manager transmitting the credit to receiving the packet is 25 ms. Once the DONE message is received, the upstream manager then transmits another credit.

In the best case scenario with a maximum sized packet, the utilization is only 70% with the 25 ms delay. The maximum transmission unit (MTU) is 1,500 bytes for this MMDS system, which is 12,000 bits/second. The maximum upstream transmission rate is 200,000 bits/sec. Thus, the time to transfer a maximum sized packet is 60 ms which is 12,000 bit/sec divided by 200,000 bits/sec. The total time to transfer a packet is 60 ms plus the 25 ms delay, which is 85 ms. Thus, the utilization is approximately 70% which is 60 ms divided by 85 ms.

In the worst case scenario with the minimum sized packet with a size of less than or equal to 120 bytes, the utilization is approximately 17%. The time to transfer 120 bytes is 5 ms. Thus, the total time to transfer a packet is 30 ms with the 25 ms delay. Thus, the utilization is approximately 17%, which is 5 ms divided by 30 ms.

In the average case scenario, 90% of all upstream packets are equal to or less than 120 bytes. Nearly 98% of upstream polling packets are equal to or less than 120 bytes, so the average case utilization is near 20%.

The polling ratio is a ratio of wireless broadband routers to channels. In this example, the polling ratio is 8:1 such as 80 wireless broadband routers to 10 channels. For small packets of 120 bytes, the inter-packet delay for a user at this packet size is 240 ms, which is 8 multiplied by 30 ms. Thus, the user can only transmit 4 packets per second. The best-case efficiency occurs when packet sizes are at their largest (1500 Bytes), and is 70%. The inter-packet delay in this case is 680 ms.

Another problem is the 25 ms delay reduces the utilization in many scenarios. Another problem is how to control traffic on the upstream bandwidth to maximize upstream utilization.

SUMMARY OF THE INVENTION

The inventions solve the above problems by determining access in a wireless communication system. A wireless control system uses wireless communications that include a plurality of channels that are shared between a plurality of wireless communication devices. The wireless control system generates and transmits a first control message that allows first access to one of the channels for one of the wireless communication devices. The wireless control system receives a termination message indicating termination of the first access. The wireless control system processes the termination message to determine an amount of time for a second access to the one of the channels for the one of the wireless communication devices. The wireless control system then generates and transmits a second control message that allows the second access and indicates the amount of time. In other embodiments, the termination message indicates a number of packets or bytes remaining to be transmitted.

In another embodiment, the wireless control system selects one of the wireless communication devices from a queue of the wireless communication devices. The wireless control system then generates and transmits a first control message that allows first access to one of the channels for the one of the wireless communication devices. The wireless control system then receives a termination message indicating termination of the first access. The wireless control system then processes the termination message to determine an order of the wireless communication devices. The wireless control system then modifies the queue based on the order.

In one embodiment, the wireless control system is an upstream manager. In another embodiment, the first control message is a credit. In one embodiment, the wireless communications are in a Multichannel Multipoint Distribution Service (MMDS) frequency range. In one embodiment, the wireless communication devices comprise wireless broadband routers.

BRIEF DESCRIPTION OF THE DRAWINGS

FIG. 12 is a table in an upstream manager for shaping traffic in an example of the invention.

A particular reference number in one figure refers to the same element in all of the other figures.

DETAILED DESCRIPTION OF THE INVENTION

Broadband Wireless System—FIGS. 1–6

FIGS. 1–6 depict a specific example of a broadband wireless system in accord with the present inventions. Those skilled in the art will appreciate numerous variations from this example that do not depart from the scope of the inventions. Those skilled in the art will also appreciate that various features described below could be combined with other embodiments to form multiple variations of the inventions. Those skilled in the art will appreciate that some conventional aspects of FIGS. 1–6 have been simplified or omitted for clarity.

Figure 1:
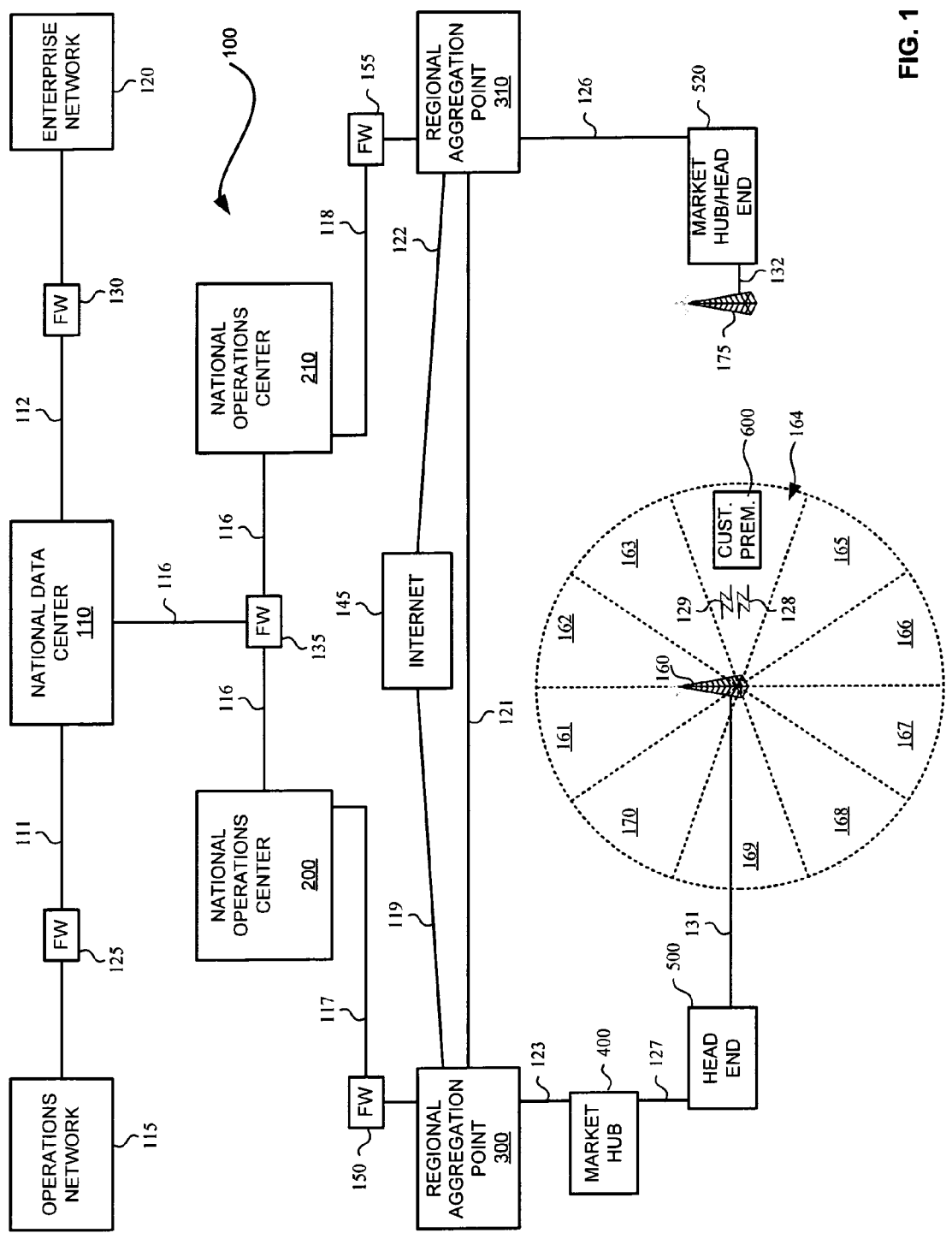
FIG. 1 is a block diagram of a broadband wireless system in an example of the invention.

FIG. 1 is a block diagram that illustrates a broadband wireless system 100 in an example of the invention. The broadband wireless system 100 is comprised of a national data center 110, an operations network 115, an enterprise network 120, a national operations center 200, a national operations center 210, an Internet 145, a regional aggregation point 300, a regional aggregation point 310, a market hub 400, a head end 500, a base antenna 160, a market hub/head end 520, a base antenna 175, and a customer premises 600.

The national data center 110 is configured to compile and display network information for the broadband wireless system 100. Network information is data that can be evaluated to operate a communication network, including performance information, fault information, billing information, and customer information.

The national data center 110 is comprised of systems that help to manage the broadband wireless system 100. Some of the systems are as follows. A national performance management system is configured to collect and store performance information for the broadband wireless system 100. The operation of a national performance management system is further discussed in FIG. 2. A national FTP server is configured to transfer large files based on File Transfer Protocol. A national RADIUS server is configured to handle user-logins and security for the national data center 110. A national Domain Naming System (DNS) server is configured to translate the names of host computers to addresses. A billing system running Portal Software is configured to generate billing records for users of the broadband wireless system 100. A network management system from Visual Networks is configured to provide a service level management and reporting service. A customer service server running Primus software from Primus Knowledge Solutions is configured to collect and process customer and product information. An ISA proxy server is configured to provide a firewall to users accessing the national data center 110. A fault detection system from Cable Master, Inc. is configured to detect and locate faults on the broadband wireless system 100. A fault management system running NetCool from Micromuse, Inc is configured to collect and process fault information for the broadband wireless system 100. A fault reporting system from Vantive is configured to provide detailed information on faults occurring on the broadband wireless system 100.

The operations network 115 is configured to process billing information, customer information, product ordering information, and another information generated from the broadband wireless system 100. The enterprise network 120 is an internal employee network configured to provide certain employees access to the network information for the broadband wireless system 100. The national operations center 200 is configured to route data within the broadband wireless system 100, collect network information for the broadband wireless system 100, and store the network information. The national operations center 200 is discussed in further detail in FIG. 2. The regional aggregation point 300 is configured to route data within the broadband wireless system 100, collect network information for the broadband wireless system 100, and store the network information. The regional aggregation point 300 is discussed in further detail in FIG. 3. The market hub 400 is configured to route data within the broadband wireless system 100, collect network information for the broadband wireless system 100, and store the network information. The market hub 400 is discussed in further detail in FIG. 4. The head end 500 is configured to communicate with a customer premises over a wireless link using the base antenna 160 and collect network information. The head end 500 is discussed in further detail in FIG. 5. The customer premises 600 is configured to communicate with the head end 500 over a wireless link. The customer premises 600 is discussed in further detail in FIG. 6.

The broadband wireless system 100 could include secondary data centers (not shown) that correspond with the national operation centers 200 and 210. The secondary data centers could be comprised of the following systems. A national performance management system that is configured to collect and store performance information for the broadband wireless system 100. The operation of a national performance management system is further discussed in FIG. 2. A national FTP test server that is configured to test the transfer of large files based on File Transfer Protocol. A national RADIUS server that is configured to handle user-logins and security for the secondary data center. A national DNS server that is configured to translate the names of host computers to addresses.

The base antenna 160 forms ten sectors 161–170. Those skilled in the art will appreciate that the base antenna 160 could form more or less sectors depending on the preferred implementation. The customer premises 600 is located in the sector 164.

The following table describes how the components in FIG. 1 are connected. The first and second columns describe the components and the third column describes the link that connects the components.

| Component | Component | Link |
| --- | --- | --- |
| National data center 110 | Operations network 115 | 111 |
| National data center 110 | Enterprise network 120 | 112 |
| National data center 110 | National operations center 200 | 116 |
| National data center 110 | National operations center 210 | 116 |
| National operations center 200 | National operations center 210 | 116 |
| National operations center 200 | Regional aggregation point 300 | 117 |
| National operations center 210 | Regional aggregation point 310 | 118 |
| Regional aggregation point 300 | Internet 145 | 119 |
| Regional aggregation point 300 | Regional aggregation point 310 | 121 |
| Regional aggregation point 310 | Internet 145 | 122 |
| Regional aggregation point 300 | Market hub 400 | 123 |
| Regional aggregation point 310 | Market hub/Head end 520 | 126 |
| Market hub 400 | Head end 500 | 127 |
| Head end 500 | Base antenna 160 | 131 |
| Base Antenna 160 | Customer premises 600 | 128–29 |
| Market hub/Head end 520 | Base antenna 175 | 132 |

The links 111–112 and 116–118 include firewalls (FW) 125, 130, 135, 150, and 155, respectively. A firewall is a system, hardware or software, configured to limit access to a system or network. The links 111–112, 116–119, 121–123, and 126–127 are DS-3 connections. Those skilled in the art will appreciate that the links 111–112, 116–119, 121–123, and 126–127 could be any type of electrical or optical connection including T-1, T-3, OC-3, OC-12, or OC-48 connections. Those skilled in the art will appreciate that the links 111–112, 116–119, 121–123, and/or 126–127 could include redundant connections to increase reliability of the links.

The broadband wireless system 100 operates as follows. The customer premises 600 communicates with systems within the Internet 145. For instance, the customer premises 600 could download a web page from a server in the Internet 145. To download the web page, the customer premises 600 accesses the server through the head end 500, the market hub 400, and the regional aggregation point 300.

The national operations centers 200 and 210 collect network information for the broadband wireless system 100. The national operations center 200 retrieves network information from the regional aggregation point 300, the market hub 400, the head end 500, and the customer premises 600. The national operations center 200 shares the network information with the national data center 110. Network information comprises performance information and fault information. The performance information is information that describes how a communication network is operating, such as throughput rates, number of transmission units, and signal-to-noise ratio. The fault information is information that identifies failures in a communication network, such as alarms and indicators of failed communication devices. The national operations center 200 processes and stores the network information. The national operations center 210 is a mirror system to the national operations center 200. The national operations center 210 retrieves and stores the same network information as the national operations center 200.

Thus, if the national operations center 200 fails, then the national operations center 210 takes over without dramatically affecting the broadband wireless system 100.

The regional aggregation point 300 routes data through the broadband wireless system 100 and collects network information for the broadband wireless system 100. The regional aggregation point 300 retrieves network information from the market hub 400, the head end 500, and the customer premises 600. The regional aggregation point 300 stores the network information and shares the network information with the national operations center 200. The regional aggregation point 310 operates similar to the regional aggregation point 300.

The market hub 400 routes data from the head end 500 to the regional aggregation point 300 and vice-versa, and collects network information for the broadband wireless system 100. The market hub 400 retrieves network information from the head end 500 and the customer premises 600. The market hub 400 stores the network information and shares the network information with the regional aggregation point 300.

The head end 500 interfaces the customer premises 600 with other components in the broadband wireless system 100 and routes data from the customer premises 600 to the market hub 400 and vice-versa. The head end 500 communicates with the customer premises 600 through the base antenna 160. The head end 500 collects network information for the broadband wireless system 100. The head end 500 transfers the network information to the market hub 400, the regional aggregation point 300, and/or the national operations center 200. The market hub/head end 520 operates similar to the market hub 400 and the head end 500.

The customer premises 600 exchanges data with the head end 500 over the wireless links 128 and 129. The customer premises 600 has two-way wireless communication with the head end 500 because both the downstream and upstream channels are over the wireless links 128 and 129. Those skilled in the art will appreciate that the upstream link 128 could be over a non-wireless link, such as a phone line or a cable modem, which is within the scope of the invention.

Figure 2:
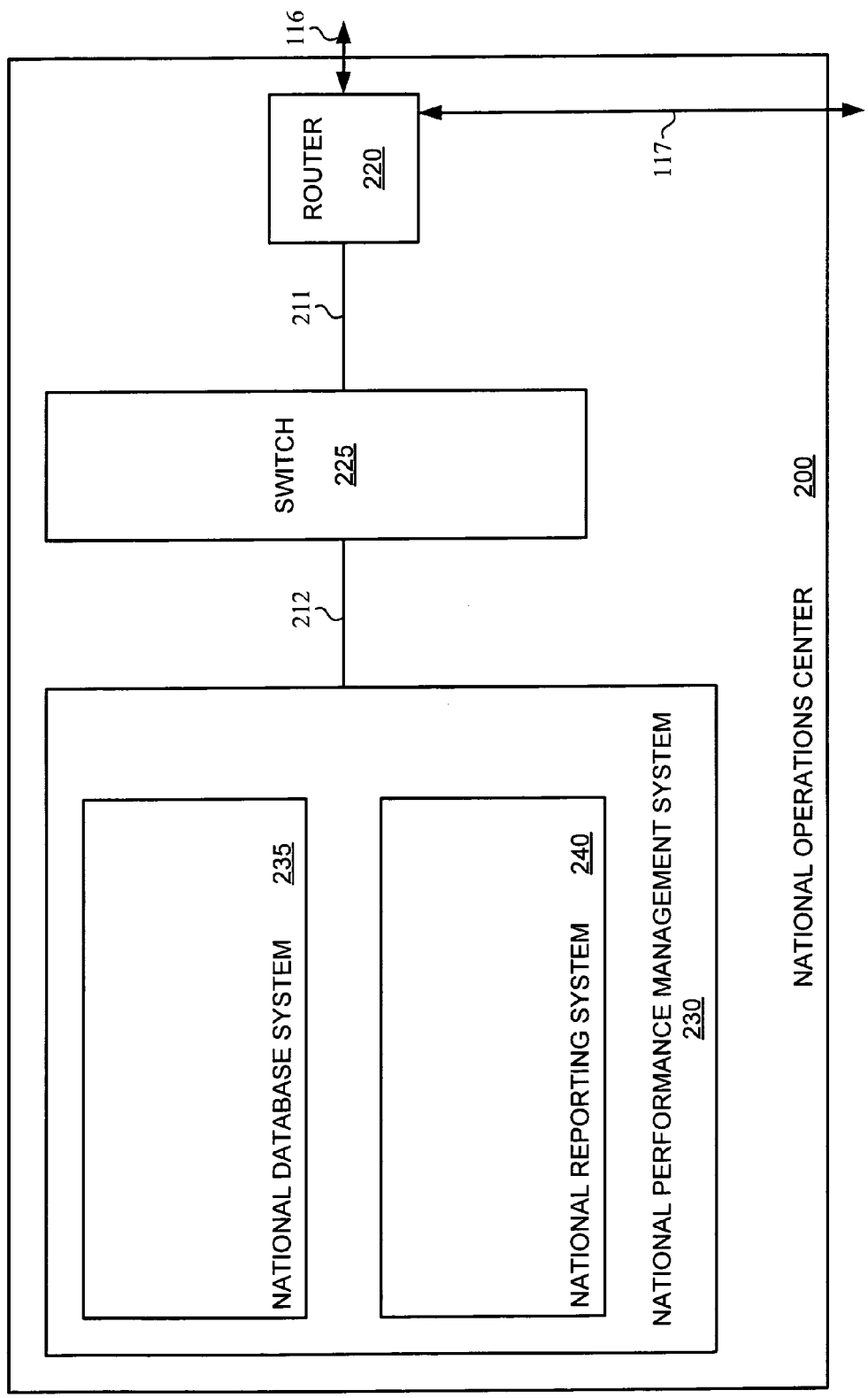
FIG. 2 is a block diagram of a national operations center in an example of the invention.

FIG. 2 is a block diagram that illustrates the national operations center 200 in an example of the invention. The national operations center 200 is comprised of a router 220, a switch 225, and a national performance management system 230. The national performance management system 230 is comprised of a national database system 235 and a national reporting system 240.

The national performance management system 230 is configured to collect, store, and report performance information for the broadband wireless system 100. The national database system 235 is configured to store performance information for the broadband wireless system 100. The national database system 235 is an Oracle database. The national reporting system 240 is configured to report the performance information for the broadband wireless system 100. The national reporting system 240 is an Apache web server.

The router 220 connects with the national data center 110 and the national operations center 210 over the link 116, and with the regional aggregation point 300 over the link 117. The router 220 connects with the switch 225 over a link 211. The link 211 is a Gigabit Ethernet connection. The switch 225 connects with the national performance management system 230 over a link 212.

In operation, the national performance management system 230 collects performance information from other components in the broadband wireless system 100. The national performance management system 230 communicates with the other components in the broadband wireless system 100 through the switch 225 and the router 220 to collect the performance information. The operation of the router 220 and the switch 225 is well known to those skilled in the art and is omitted for the sake of brevity. The national database system 235 stores the collected performance information. The national reporting system 240 retrieves the performance information from the national database system 235 and provides user-friendly formats of the performance information. Examples of the user-friendly formats are data files, HTML files, or other types of files. The national reporting system 240 provides other systems access to the performance information. For instance, a user system within the Internet 145 could access the national reporting system 240 and view the performance information using a Web browser. Also, the national data center 110 could retrieve the performance information from the national reporting system 240 through a File Transfer Protocol (FTP) command and store the performance information.

Figure 3:
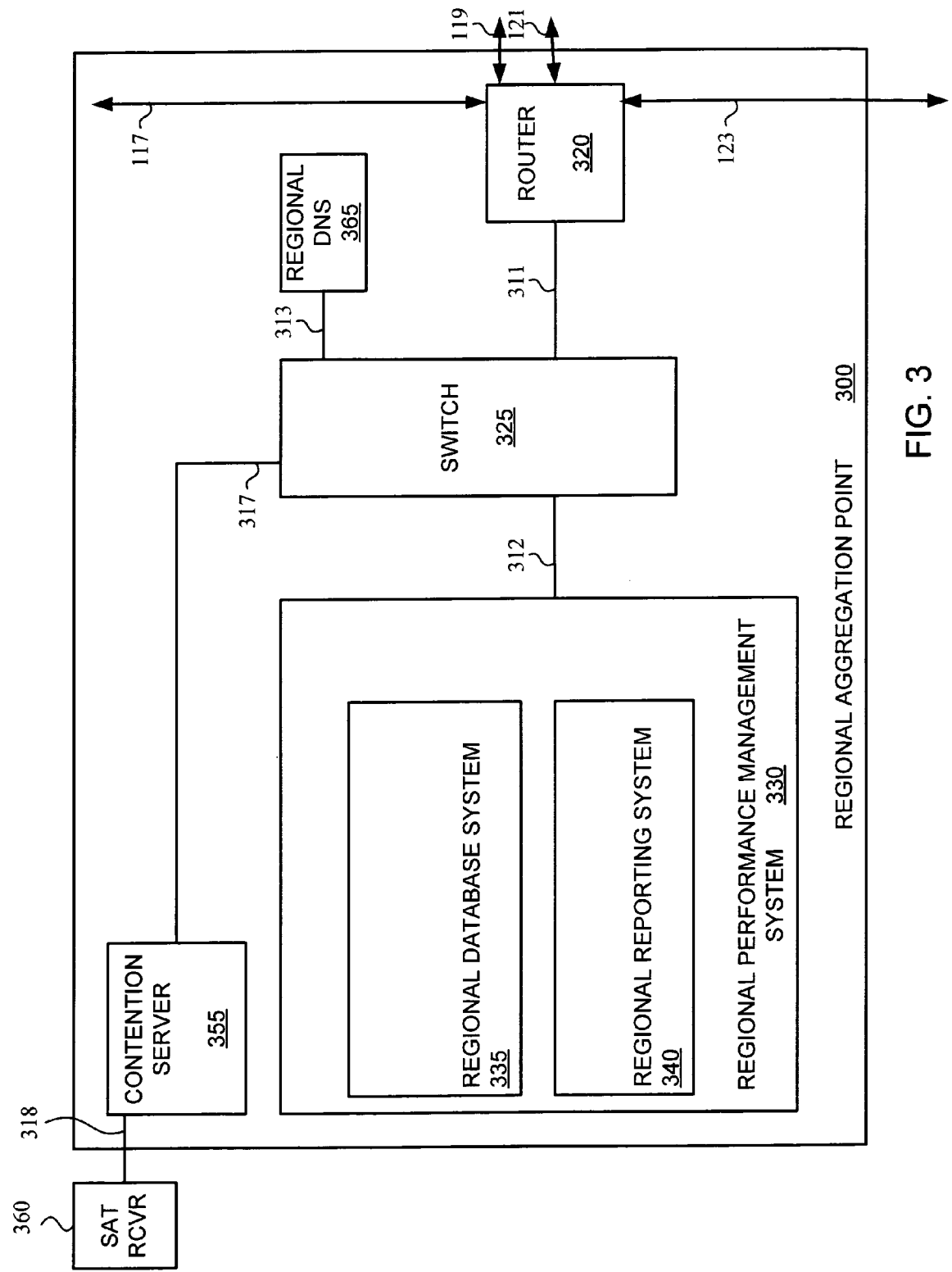
FIG. 3 is a block diagram of a regional aggregation point in an example of the invention.

FIG. 3 is a block diagram that illustrates the regional aggregation point 300 in an example of the invention. The regional aggregation point 300 is comprised of a router 320, a switch 325, a regional performance management system 330, a contention server 355, a satellite receiver 360, and a regional DNS server 365. The regional performance management system 330 is comprised of a regional database system 335 and a regional reporting system 340.

The router 320 is a GSR 12016 router from Cisco Systems. The switch 325 is a 6506 switch from Cisco Systems. The regional performance management system 330 is configured to collect, store, and report performance information for the broadband wireless system 100. The regional database system 335 is configured to store performance information for broadband wireless system 100. The regional database system 335 is an Oracle database. The regional reporting system 340 is configured to report performance information for the broadband wireless system 100. The regional reporting system 340 is an Apache web server. The contention server 355 and the satellite receiver 360 are from Cidera Co. The satellite receiver 360 is a Global Positioning System (GPS) receiver. The regional DNS server 365 is a Netra 1145 server from Sun Microsystems that is configured to translate the names of host computers to addresses.

The router 320 connects with the national operations center 200, the Internet 145, the regional aggregation point 310, and the market hub 400 over the links 117, 119, 121, and 123, respectively. The router 320 connects with the switch 325 over a link 311. The link 311 is a Gigabit Ethernet connection. The switch 325 connects with the regional performance management system 330 over a link 312. The switch 325 connects with the contention server 355 over a link 317. The contention server 355 connects with the satellite receiver 360 over a link 318. The link 318 is a coaxial cable. The switch 325 connects with the regional DNS server 365 over a link 313.

In operation, the regional performance management system 330 collects performance information for the broadband wireless system 100. The regional performance management system 330 communicates with other components in the broadband wireless system 100 through the switch 325 and the router 320 to collect the performance information. The operation of the router 320 and the switch 325 is well known to those skilled in the art and is not discussed for the sake of brevity. The regional database system 335 stores the collected performance information. The regional reporting system 340 retrieves the performance information from the regional database system 335 and provides user-friendly formats of the performance information. Examples of the user-friendly formats are data files, HTML files, or other types of files. The regional reporting system 340 provides other systems access to the performance information. For instance, a user system within the Internet 145 could access the regional reporting system 340 and view the performance information using a Web browser. Also, the national performance management system 230 could retrieve the performance information from the regional reporting system 340 for storage in the national database system 235.

The contention server 355 receives configuration information from a content delivery network through the satellite receiver 360. The configuration information is used to pre-configure the regional performance management system 330. The configuration information is also used to update or re-configure the regional performance management system 330.

Figure 4:
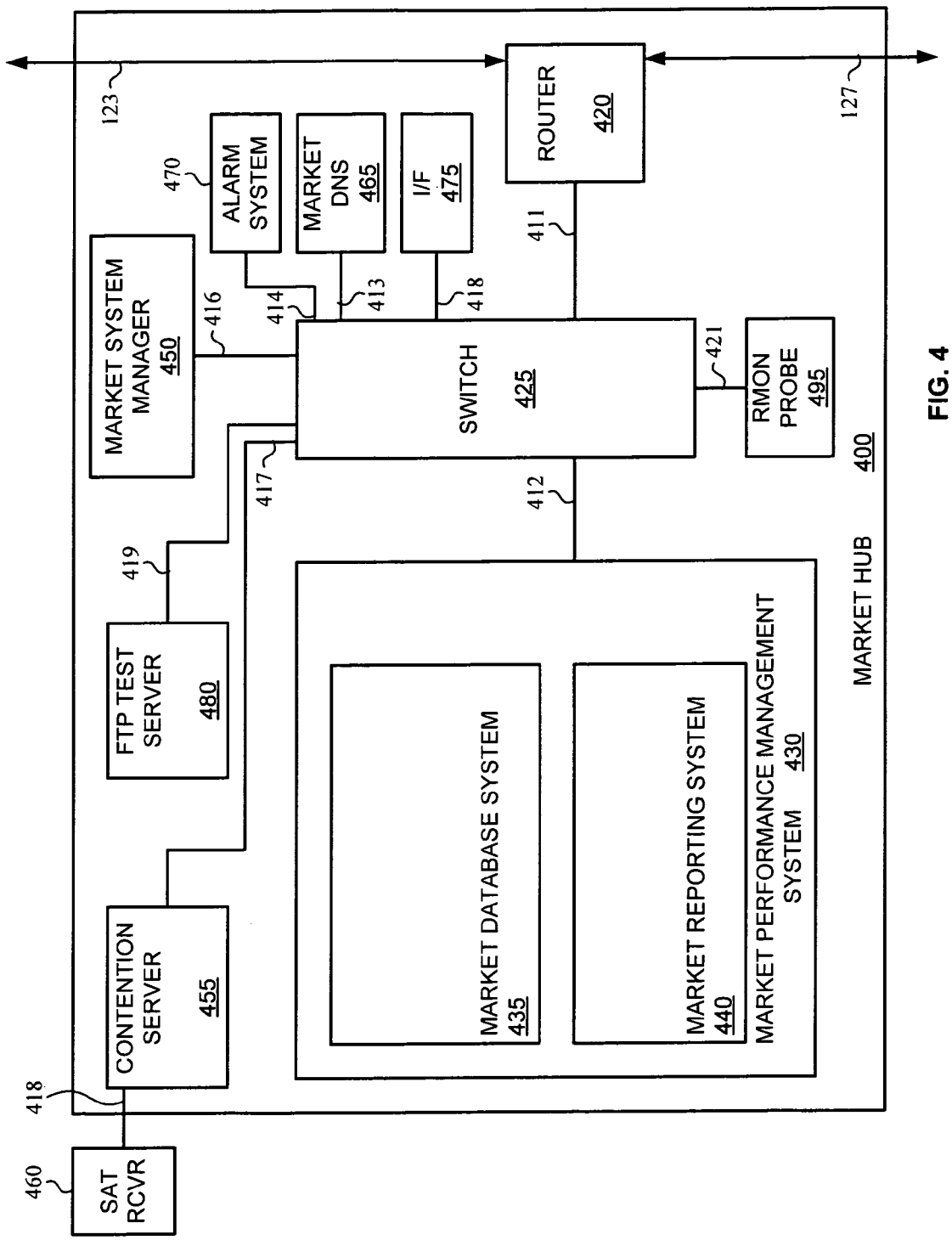
FIG. 4 is a block diagram of a market hub in an example of the invention.

FIG. 4 is a block diagram that illustrates the market hub 400 in an example of the invention. The market hub 400 is comprised of a router 420, a switch 425, a market performance management system 430, a market system manager 450, a contention server 455, a satellite receiver 460, a market DNS server 465, an alarm system 470, an interface 475, an FTP test server 480, and an RMON probe 495. The market performance management system 430 comprises a market database system 435 and a market reporting system 440.

The router 420 is a 7507 router from Cisco Systems. The switch 425 is a 6506 switch from Cisco Systems. The market performance management system 430 is configured to collect, store, and report performance information for the broadband wireless system 100. The market database system 435 is configured to store performance information for the broadband wireless system 100. The market database system 435 is an Oracle database. The market reporting system 440 is configured to report performance information for the broadband wireless system 100. The market reporting system 440 is an Apache web server. The market system manager 450 is a CyberManager 2000 (CMG-2000) from Hybrid Networks, Inc. The contention server 455 and the satellite receiver 460 are from Cidera Co. The satellite receiver 460 is a Global Positioning System (GPS) receiver. The market DNS server 465 is a Netra 1145 server from Sun Microsystems that is configured to translate the names of host computers to addresses. The alarm system 470 is an AlScout system from Applied Innovations, Inc. that is configured to monitor the broadband wireless system 100. The interface 475 is a Cybex interface configured to provide a computer interface to upstream and downstream managers in the head end 500. The upstream and downstream managers will be discussed further in FIG. 5. The FTP test server 480 is configured to test large file transfers based on File Transfer Protocol. The RMON probe 495 is a NetScout probe from NetScout Systems, Inc. that is configured to capture and define traffic information passing through a given point using RMON standards.

The router 420 connects with the regional aggregation point 300 and the head end 500 over the links 123 and 127, respectively. The router 420 connects with the switch 425 over a link 411. The link 411 is a Gigabit Ethernet connection. The switch 425 connects with the market performance management system 430 over a link 412. The switch 425 connects with the market system manager 450 over a link 416. The switch 425 connects with the contention server 455 over a link 417. The contention server 455 connects with the satellite receiver 460 over a link 418. The link 418 is a coaxial cable. The switch 425 connects with the market DNS server 465 over a link 413. The switch 425 connects with the alarm system 470 over a link 414. The switch 425 connects with the interface 475 over a link 418. The switch 425 connects with the FTP test server 480 over a link 419. The switch 425 connects with the RMON probe 495 over a link 421.

In operation, the market performance management system 430 collects performance information for the broadband wireless system 100. The market performance management system 430 communicates with other components in the broadband wireless system 100 through the switch 425 and the router 420 to collect the performance information. The operation of the router 420 and the switch 425 is well known to those skilled in the art and is not discussed for the sake of brevity. The market database system 435 stores the collected performance information. The market reporting system 440 retrieves the performance information from the market database system 435 and provides user-friendly formats of the performance information. Examples of the user-friendly formats are data files, HTML files, or other types of files. The market reporting system 440 provides other systems access to the performance information. For instance, a user system within Internet 145 could access the market reporting system 440 and view the performance information using a Web browser. Also, the national performance management system 230 and/or the regional performance management system 330 could retrieve the performance information from the market reporting system 440 for storage in the national database system 235 and the regional database system 335, respectively.

The market system manager 450 monitors and stores routing information for upstream and downstream routing within the broadband wireless system 100. The market system manager 450 provides other systems access to the routing information.

The contention server 455 receives configuration information from a content delivery network through the satellite receiver 460. The configuration information is used to pre-configure the market performance management system 430 or the market system manager 450. The configuration information is also used to update or re-configure the market performance management system 430 or the market system manager 450.

Figure 5:
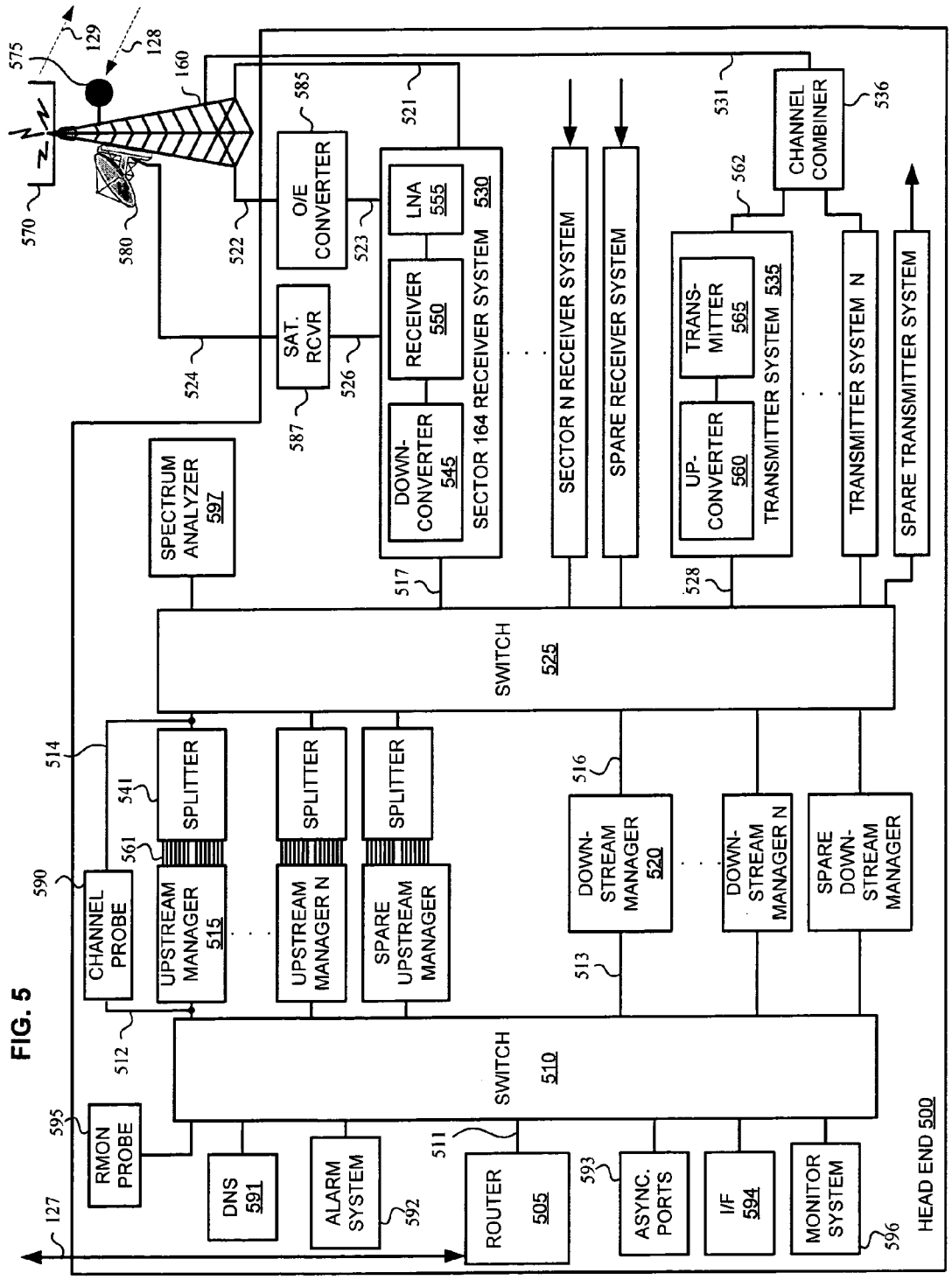
FIG. 5 is a block diagram of a head end in an example of the invention.

FIG. 5 is a block diagram that illustrates the head end 500 in an example of the invention. The head end 500 is comprised of a router 505, a switch 510, an upstream manager 515, a splitter 541, a downstream manager 520, a switch 525, a spectrum analyzer 597, a receiver system 530, a transmitter system 535, a channel combiner 536, an Optical-to-Electrical (O/E) converter 585, a satellite receiver 587, the base antenna 160, a DNS server 591, an alarm system 592, asynchronous ports 593, an interface 594, and a monitor system 596. The receiver system 530 is comprised of a down-converter 545, a receiver 550, and a Low Noise Amplifier (LNA) 555. The transmitter system 535 is comprised of an up-converter 560 and a transmitter 565. The base antenna 160 is comprised of a transmitter antenna 570, a receiver antenna 575, and a satellite antenna 580. The head end 500 also includes a channel probe 590 and an RMON probe 595.

Those skilled in the art will appreciate that the base antenna 160 could be positioned at a high altitude to improve communications. For instance, the base antenna 160 could be positioned on a mountain or a tall building. Consequently, the base antenna 160 could be placed at a remote location in relation to the head end 500. The base antenna 160 has a range of approximately 35 miles.

The router 505 is a 7507 router from Cisco Systems. The switch 510 is a 6506 switch from Cisco Systems. The upstream manager 515 is configured to manage data on upstream channels. The upstream manager 515 is a CyberMaster Upstream Router (CMU-2000-14C) from Hybrid Networks, Inc. The downstream manager 520 is configured to manage data on downstream channels. The downstream manager 520 is a CyberMaster Downstream Router (CMD-2000) from Hybrid Networks, Inc. The switch 525 is a 44 MHz Intermediate Frequency (IF) switch from PESA Switching Systems, Inc. The receiver system 530 is configured to receive a Radio Frequency (RF) signal and convert the RF signal into an IF signal. The receiver system 530 is a receiver from ADC Telecommunications Co. The transmitter system 535 is configured to receive an IF signal, convert the IF signal into a 6 MHz RF signal, and transmit the RF signal. The base antenna 160 is an antenna from Andrew Corp. The RMON probe 595 is a NetScout probe from NetScout Systems, Inc. that is configured to capture and define traffic information passing through a given point using RMON standards. The channel probe 590 is a Hybrid probe from Hybrid Networks, Inc. that is configured to monitor channel information for the upstream and downstream channels. The DNS server 591 is a Netra 1145 server from Sun Microsystems that is configured to translate the names of host computers to addresses. The alarm system 592 is an AlScout system from Applied Innovations, Inc. that is configured to monitor the broadband wireless system 100. The asynchronous ports 593 are Cisco 2620 asynchronous ports that are configured to provide access to the upstream manager 515 and the downstream manager 520. The interface 594 is a Cybex interface configured to provide a computer interface to the upstream manager 515 and the downstream manager 520. The monitor system 596 is a SCADA system that is configured to monitor the receiver system 530 and the transmitter system 535.

The router 505 connects with the market hub 400 over the link 127. The router 505 connects with the switch 510 over a link 511. The link 511 is a Gigabit Ethernet connection. The switch 510 connects with the upstream manager 515 over a link 512 and the downstream manager 520 over a link 513. The upstream manager 515 connects with the splitter 541 over links 561. The splitter 541 connects with the switch 525 over a link 514. The downstream manager 520 connects with the switch 525 over a link 516. The links 512–514, 516, and 561 are configured to transport Transmission Control Protocol/Internet Protocol (TCP/IP) packets.

The switch 525 connects with the receiver system 530 over a link 517. The link 517 is configured to transport an IF signal. The receiver system 530 connects with the receiver antenna 575 of the base antenna 160 over a link 521. The link 521 is a wire cable configured to transport an RF signal.

The receiver system 530 connects with the satellite receiver 587 over a link 526. The satellite receiver 587 connects with the satellite antenna 580 on the base antenna 160 over a link 524. The links 526 and 524 are coaxial cables.

The receiver system 530 connects to the O/E converter 585 over a link 523. The O/E converter 585 connects with the receiver antenna 575 on the base antenna 160 over a link 522. The link 522 is a fiber optic cable.

The switch 525 connects with the transmitter system 535 over a link 528. The link 528 is configured to transport an IF signal. The transmitter system 535 connects with the channel combiner 536 over a link 562. The channel combiner 536 is also configured to connect with other transmitter systems. The channel combiner 536 connects with the transmitter antenna 570 on the base antenna 160 over a link 531. The link 531 is a wire cable configured to transport an RF signal. Those skilled in the art will appreciate that links 521, 522, 524, and 531 correspond to link 131 in FIG. 1.

The channel probe 590 connects to the links 512 and 514. The channel probe is configured to monitor channel information for the upstream and downstream channels. The configuration and operation of the channel probe 590 is discussed in further detail in FIGS. 14–16. The RMON probe 595 connects to the switch 510. The RMON probe 595 is configured to capture and define traffic information passing through a given point using RMON standards. The configuration and operation of the RMON probe 595 is discussed in further detail in FIGS. 22–24.

The head end 500 operates as follows. The head end 500 communicates with the market hub 400 and the customer premises 600. The downstream manager 520 routes data to the customer premises 600. The data could be from other components in the broadband wireless system 100. The downstream manager 520 communicates with the other components through the switch 510 and the router 505. The operation of the router 505 and the switch 510 is well known to those skilled in the art and is not discussed for the sake of brevity. Those skilled in the art will appreciate that the head end 500 can include multiple downstream managers. The head end 500 could also include a spare downstream manager in case of failure of one of the main downstream managers.

The downstream manager 520 receives packets that contain the data from the switch 510 over the link 513. The downstream manager 520 processes the packets to extract the data. The downstream manager 520 converts the data into an IF signal. The downstream manager 520 transmits the IF signal to the transmitter system 535 through the switch 525 over the links 516 and 528. Those skilled in the art will appreciate that the head end 500 can include multiple transmitter systems to transmit multiple signals. The head end 500 could also include a spare transmitter system in case of failure of one of the main transmitter systems. The switch 525 switches between the multiple transmitter systems. The up-converter 560 and the transmitter 565 function together to process the IF signal and convert the IF signal into a 6 MHz RF signal. The channel combiner 536 combines the RF signals from the transmitter systems and transmits an RF signal to the transmitter antenna 570 over the link 531.

The transmitter antenna 570 is an omni-directional antenna. The transmitter antenna 570 transmits the RF signal to the customer premises 600 on the downstream channels over the link 129. The RF signal is a Multichannel Multipoint Distribution Service (MMDS) signal. The MMDS frequencies range from 2596 MHz to 2644 MHz. The MMDS signals in this example also include the Multipoint Distribution Service (MDS) frequencies. The MDS frequencies comprise MDS1 (2150-2156 MHz) and MDS2 (2156-2162 MHz). The bandwidth of the downstream channels is approximately 8 Mbps.

Concurrently, the upstream manager 515 routes data, received from the customer premises 600, to the broadband wireless system 100. The upstream manager 515 communicates with other components in the broadband wireless system 100 through the switch 510 and the router 505.

The upstream manager 515 receives the data from the customer premises 600 through the receiver system 530 and the receiver antenna 575. The receiver antenna 575 is a directional antenna. The receiver antenna 575 forms the sector 164 shown in FIG. 1 based on the direction in which it points. Any communication device that communicates with the receiver antenna 575 is considered within the sector 164. Those skilled in the art will appreciate that the base antenna 160 could include a plurality of receiver antennas that form sectors 161–163 and 165–170. Those skilled in the art will also appreciate that the head end 500 could include a plurality of upstream managers depending on the number of sectors controlled by the head end 500. The head end 500 could also include a spare upstream manager in case of failure of one of the main upstream managers.

The receiver antenna 575 receives an RF signal from the customer premises 600 on the upstream channels over the link 128. The RF signal is also an MMDS signal. The bandwidth of the upstream channels is approximately 200 kbps.

The receiver antenna 575 transfers the RF signal over the link 521 to the receiver system 530. The receiver system 530 corresponds to the sector 164. The LNA 555 amplifies the RF signal. The receiver 550 and the down-converter 545 function together to process the amplified RF signal and convert the amplified RF signal into an IF signal. The receiver system 530 transfers the IF signal to the splitter 541 through the switch 525 over the links 517 and 514. Those skilled in the art will appreciate that the head end 500 can include a plurality of receiver systems, wherein each receiver system corresponds to a sector. The head end 500 could also include a spare receiver system in case of failure of one of the main receiver systems. The switch 525 switches between multiple receiver systems and multiple upstream managers. For instance, if the head end 500 controls ten sectors, then the switch 525 would connect ten upstream managers to eight receiver systems.

The upstream manager 515 receives the IF signal from the splitter 541 over the links 561. The upstream manager 515 corresponds to the sector 164. The upstream manager 515 processes the IF signal to route the data carried by the IF signal. The upstream manager 515 generates packets and inserts the data, carried by the IF signal, into the packets. The upstream manager 515 transmits the packets to the switch 510 for transmission to other components in the broadband wireless system 100.

The upstream manager 515 also generates control messages for the customer premises 600. The control messages are any instruction, signal, or message that provides control of wireless communications. One example of control messages allows usage or access to a subchannel for a period of time or for the transfer of a maximum number of transmission units such as bytes. The upstream manager 515 transmits these control messages to the downstream manager 520 through the switch 510. The downstream manager 520 transmits the control messages to a wireless broadband router that is located in the customer premises 600. The wireless broadband router is further discussed in FIG. 6. The wireless broadband router communicates with the upstream manager and the downstream manager to exchange data.

The upstream manager 515 separates the upstream channels into subchannels. The upstream manager 515 polls numerous wireless broadband routers in sectors 161–170 to allocate use of subchannels. Polling is a round robin process to determine which wireless broadband router has access to a subchannel. The upstream manager 515 maintains a queue of the active wireless broadband routers to determine which wireless broadband router is next to transmit over a subchannel for a period of time. In one embodiment, the queue is in a Channeling Scheduling Daemon (CSD) in the upstream manager 515.

The upstream manager 515 uses the control messages to grant a wireless broadband router use of a subchannel for a limited period of time. In this example. the control messages are credits. A credit is a message that allows usage of a subchannel for a period of time or for the transfer of a maximum number of transmission units such as bytes. One example of a credit includes information such as a subchannel or frequency range, a maximum allowed time to transfer data, and a maximum number of bytes the wireless broadband router is allowed to transfer.

There are two kinds of credits: polling and dedicated. Polling credits are credits related to polling of the wireless broadband routers. Polling credits are generally smaller than the dedicated credits. Once the wireless broadband router completes transfer of the packets, the wireless broadband router transmits a DONE message to the upstream manager 515 via the upstream channels. The DONE messages include information such as the number of bytes sent and the number of packets left for the wireless broadband router to transfer. If the DONE message shows that the wireless broadband router has more than three packets left to transfer and there are available subchannels, then the upstream manager 515 issues a dedicated credit to the wireless broadband router.

The receiver system 530 also receives a 10 MHz signal from the satellite receiver 587. The satellite antenna 580 receives satellite signals and transmits the satellite signals to the satellite receiver 587 over the link 524. The satellite receiver 587 processes the satellite signals to generate the 10 MHz signal. The satellite receiver 587 transmits the 10 MHz signal to the receiver system 530 over the link 526. The receiver system 530 uses the 10 MHz signal as a reference signal.

In some examples, the receiver system 530 communicates with the receiver antenna 575 over the links 522–523 and the O/E converter 585. In this example, the link 522 is a fiber optic cable. Depending on the number of receiver antennas on the base antenna 160, the number of wire cables, such as the link 521, running from the base antenna 160 could become large. A large number of wire cables can be heavy and can add stress to the structure of the base antenna 160. Fiber optic cable, on the other hand, can be lighter than wire cable. Therefore, it may be advantageous to run fiber optic cable between the base antenna 160 and the receiver system 530. In such a case, the O/E converter 585 is used to convert the optical signal to an electrical signal.

Figure 6:
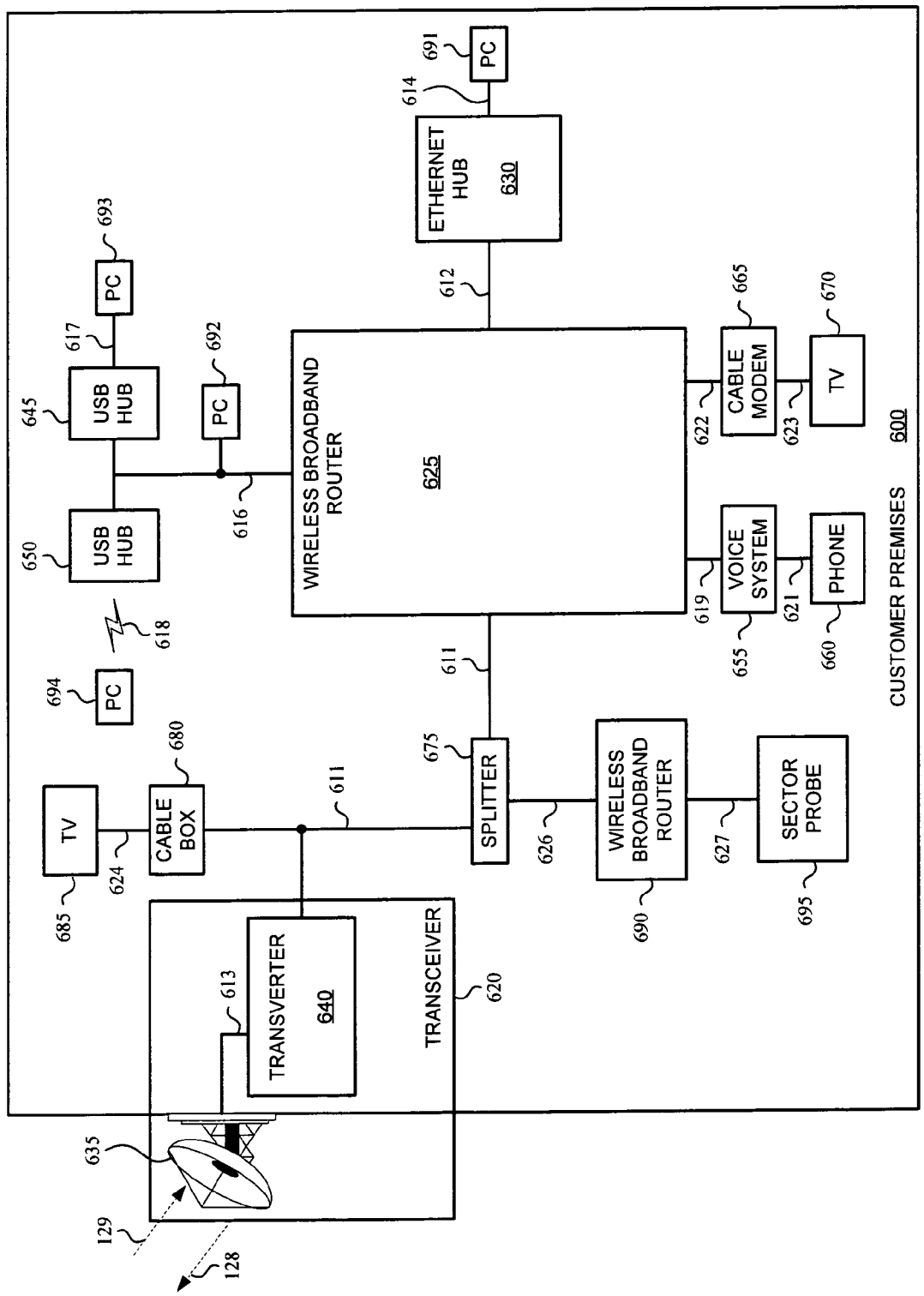
FIG. 6 is a block diagram of a customer premises in an example of the invention.

FIG. 6 is a block diagram that illustrates the customer premises 600 in an example of the invention. The customer premises 600 is comprised of a transceiver 620, a wireless broadband router 625, an Ethernet hub 630, and a computer (PC) 691. The transceiver 620 is comprised of a directional antenna 635 and a transverter 640. The customer premises 600 also includes a Universal Serial Bus (USB) hub 645, a USB hub 650, PCs 692–694, a voice system 655, a phone 660, a cable modem 665, a TV 670, a cable box 680, a TV 685, a splitter 675, a wireless broadband router 690, and a sector probe 695.

Examples of the customer premises 600 are residences or businesses. The transceiver 620 is configured to transmit and receive a wireless signal. The transceiver 620 is a transceiver from California Amplifier, Inc. The wireless broadband router 625 is configured to process packets to generate an IF signal, and vice-versa. The wireless broadband router 625 is a Series 2000 Wireless Broadband Router from Hybrid Networks, Inc. The Ethernet hub 630 is configured to interface multiple Ethernet connections. The Ethernet hub 630 is an Ethernet Hub from Netgear.

The USB hub 645 is a USB hub from Lucent Technologies. The USB hub 650 is an 802.11 wireless Ethernet standard hub from Lucent Technologies. The voice system 655 is configured to process voice data that is transmitted over packets. The splitter 675 is a 3 dB splitter. The wireless broadband router 690 is a Series 2000 Wireless Broadband Router from Hybrid Networks, Inc. The sector probe 695 is configured to collect performance information from the customer premises side.

The directional antenna 635 connects with the transverter 640 over a link 613. The link 613 is a coaxial cable. The transverter 640 connects with the wireless broadband router 625 over a link 611. The link 611 is an RG-59 coaxial cable. The wireless broadband router 625 connects with the Ethernet hub 630 over a link 612. The Ethernet hub 630 connects with the PC 691 over a link 614. The links 612 and 614 are Ethernet connections. Those skilled in the art will appreciate that the Ethernet hub 630 could also communicate with a Local Area Network (not shown).

The wireless broadband router 625 connects with a Universal Serial Bus (USB) 616. The USB 616 connects with the PC 692, the USB hub 645, and the USB hub 650. The USB hub 645 connects with the PC 693 over a link 617. The link 617 is an Ethernet connection. The USB hub 650 connects with the PC 694 over a link 618. The link 618 is a wireless Ethernet connection. The wireless broadband router 625 connects with the voice system 655 over a link 619. The voice system 655 connects with the phone 660 over a link 621. The wireless broadband router 625 connects with the cable modem 665 over a link 622. The cable modem 665 connects with the TV 670 over a link 623. The link 623 is a coaxial cable. The cable box 680 connects with the link 611 and is configured to receive a cable television feed. The cable box 680 connects with the TV 685 over a link 624. The link 624 is a coaxial cable.

The link 611 includes the splitter 675. The wireless broadband router 690 connects with the splitter 675 over a link 626. The link 626 is an RG-59 coaxial cable. The wireless broadband router 690 connects with the sector probe 695 over a link 627. The configuration and operation of the sector probe 695 will be discussed in further detail in FIGS. 8–13.

Those skilled in the art will appreciate that the transceiver 620, the cable box 680, the voice system 655, the cable modem 665, the USB hub 645, the USB hub 650, and the Ethernet hub 630 could be incorporated within the wireless broadband router 625.

The customer premises 600 operates as follows. The customer premises 600 communicates with the head end 500. To receive data from the head end 500, the directional antenna 635 receives an RF signal on the downstream channels over the link 129. The directional antenna 635 transfers the RF signal to the transverter 640. The transverter 640 processes the RF signal and converts the RF signal to an IF signal. The transverter 640 transmits the IF signal to the wireless broadband router 625 over the link 611. The wireless broadband router 625 processes the IF signal and converts the IF signal into packets containing the data. The wireless broadband router 625 transmits the packets to the Ethernet hub 630 over the link 612. Those skilled in the art will appreciate that the wireless broadband router 625 could transmit packets to the USB hub 645, the USB hub 650, the PC 692, the voice system 655, and the cable modem 665. The Ethernet hub 630 transmits the packets to the PC 691 over the link 614.

To transmit data to the head end 500, the PC 691 transmits packets, containing data, to the Ethernet hub 630 over the link 614. The Ethernet hub 630 transfers the packets to the wireless broadband router 625 over the link 612. The wireless broadband router 625 processes the packets and converts the data contained in the packets into an IF signal. Those skilled in the art will appreciate that the wireless broadband router 625 could also receive packets from the USB hub 645, the USB hub 650, the PC 692, the voice system 655, and the cable modem 665. The wireless broadband router 625 transfers the IF signal to the transverter 640 over the link 611. The transverter 640 processes the IF signal and converts the IF signal into an RF signal. The transverter 640 also amplifies the RF signal. The transverter 640 transmits the RF signal to the directional antenna 635. The directional antenna 635 transmits the RF signal to the head end 500 on the upstream channels over the link 128.

Credits in the Broadband Wireless System—FIGS. 7–14

FIGS. 7–14 disclose embodiments of the inventions, but the inventions are not restricted to the configuration provided below. Those skilled in the art will appreciate numerous variations in a communication system configuration and operation that are within the scope of the inventions. Those skilled in the art will also appreciate how the principles illustrated in this example can be used in other examples of the inventions.

Figure 7:
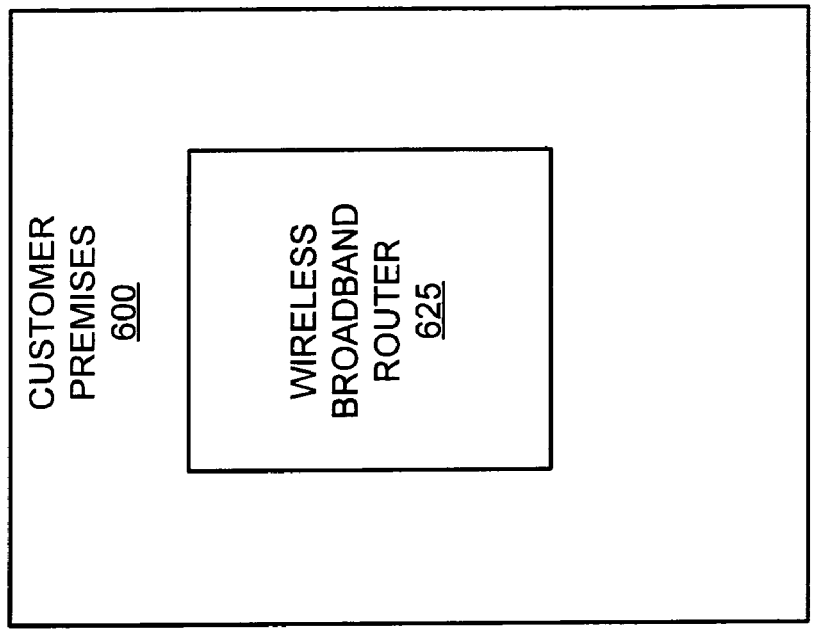
FIG. 7 is a block diagram of a broadband wireless system in an example of the inventions.
Figure 7:
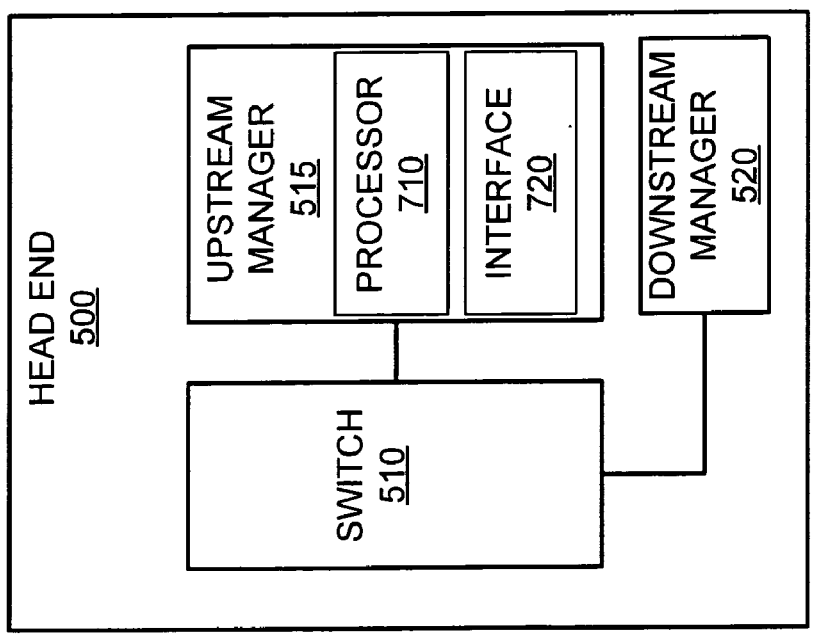

FIG. 7 depicts a block diagram of a broadband wireless system in an example of the inventions. FIG. 7 is a simplification of FIGS. 5 and 6 to focus on the components related to credits for the embodiments of the inventions below. Other components and connections in FIGS. 5 and 6 have been omitted for the purposes of clarity and simplicity. FIG. 7 includes the head end 500 and the customer premises 600. There are numerous customer premises 600 in the broadband wireless system, but only one is shown in FIG. 7 for the sake of simplicity. The head end 500 comprises the switch 510, the upstream manager 515, and the downstream manager 520. The upstream manager 515 comprises a processor 710 and an interface 720. The switch 510 is connected to the upstream manager 515 and the downstream manager 520. The customer premises 600 comprise the wireless broadband router 625. The upstream manager 515 and the downstream manager 520 are examples of wireless control systems. A wireless control system is any system configured to use wireless communications and provide control over the wireless communications. Some examples of providing control are discussed below in the operation of the upstream manager 515.

Figure 8:
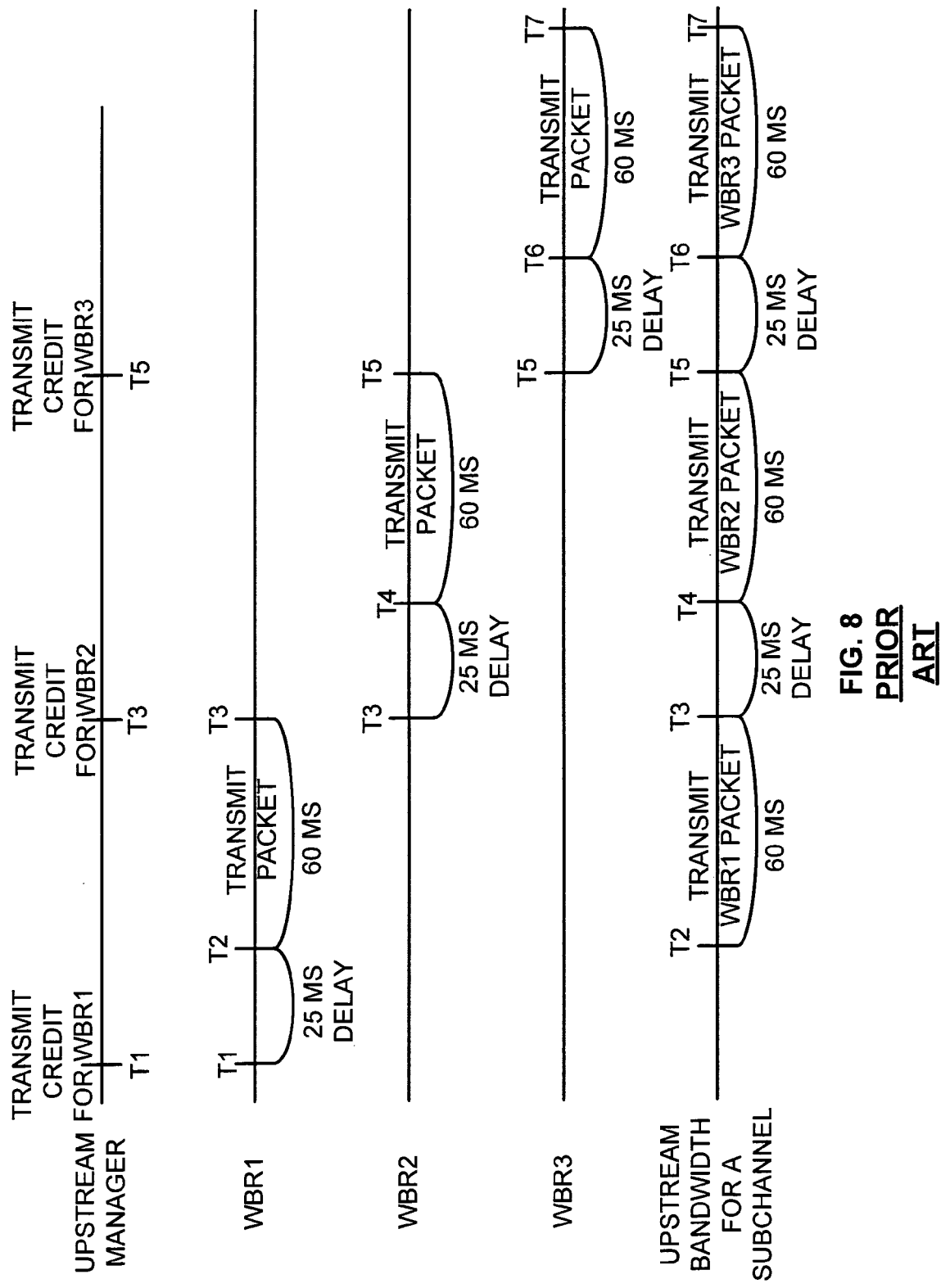
FIG. 8 is a time line for an upstream manager, three wireless broadband routers, and an upstream bandwidth for a channel in the prior art.

FIG. 8 depicts a time line for the upstream manager 515, three wireless broadband routers, and an upstream bandwidth for a channel in the prior art. FIG. 8 illustrates one problem of the delay between the upstream manager 515 transmitting a credit and the wireless broadband router 625 transmitting a packet. In FIG. 8, the upstream manager 515 generates and transmits credits to three wireless broadband routers that access one channel in the upstream bandwidth from the wireless broadband routers to the upstream manager 515. At time T1, the upstream manager 515 generates and transmits a first credit for the first wireless broadband router 625 via the switch 510 and the downstream manager 520.

After approximately a 1 ms delay, the downstream manager 520 frames the credit into a Media Access control protocol, performs FEC and interleaving, and encapsulates the credit in UDP/IP, which delays the credit for approximately 12 ms. The first wireless broadband router 625 then receives the credit, performs FEC on the credit and interleaving, and queues a packet for the channel based on the credit, which results in total results in a delay of approximately another 12 ms. The total delay from the upstream manager 515 transmitting the credit to the wireless broadband router 625 transmitting the packet is 25 ms. From time T2 to T3, the first wireless broadband router 625 transmits the packet on the channel specified on the first credit on the upstream bandwidth to the upstream manager 515.

At time T3, the upstream manager 515 receives a DONE message indicating the transmission of the packet is terminated. The upstream manager 515 then generates and transmits a second credit for the second wireless broadband router via the switch 510 and the downstream manager 520. As described above, there is a 25 ms delay from transmitting the second credit to transmitting the packet. From time T4 to T5, the second wireless broadband router transmits the packet on the channel specified on the second credit on the upstream bandwidth to the upstream manager 515. At time T5, the upstream manager 515 then generates and transmits a third credit for the third wireless broadband router via the switch 510 and the downstream manager 520. As described above, there is a 25 ms delay from transmitting the third credit to transmitting the packet. From time T6 to T7, the third wireless broadband router transmits the packet on the channel specified on the third credit on the upstream bandwidth to the upstream manager 515.

One problem is the upstream bandwidth is not maximized because of the delays in between transmission of packets. In FIG. 8, the upstream bandwidth for a channel shows a 25 ms delay in between the 60 ms packet transmissions. Thus, the upstream bandwidth is not fully utilized, which inhibits the overall performance of the broadband wireless system.

In one embodiment, the upstream manager 515 uses credit timers to reduce the delay from transmitting a credit to receiving a packet from the wireless broadband router. As discussed above, the delay is attributed to transmission delays, framing, forward error correction, interleaving, and queuing. In order to reduce this delay, the upstream manager 515 uses a credit timer to issue a credit after the credit timer expires or after a DONE message is received. The credit timer is set to expire after the maximum time to transfer a packet. By issuing credits after the credit timer expires, credits overlap with other outstanding credits to eliminate the transmission delays for credits. In this embodiment, the credit timer is included within the Channeling Scheduling Daemon (CSD) in the upstream manager 515. The reduction of the transmission delays for credits is further discussed in FIG. 10. There are numerous other instructions or components that can accomplish the same function as a credit timer such as a wait instruction, a repeat loop for a period of time, and a scheduler.

Figure 9:
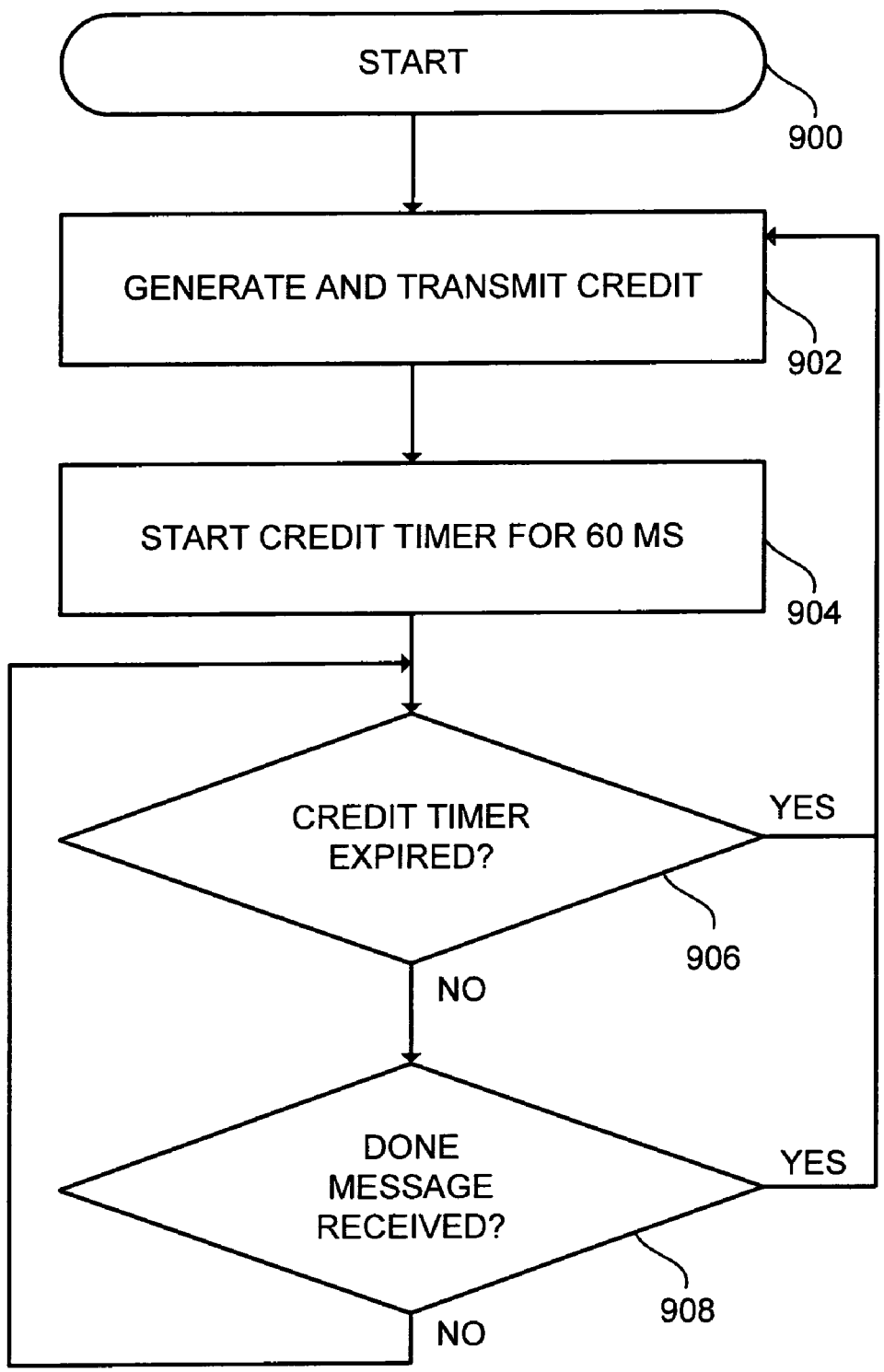
FIG. 9 is a flow chart of an upstream manager with a credit timer in an example of the invention.

FIG. 9 depicts a flow chart of the upstream manager 515 with a credit timer in an example of the invention. FIG. 9 begins in step 900. In step 902, the upstream manager 515 generates and transmits a credit to the wireless broadband router 625. In step 904, the upstream manager 515 starts a credit timer for 60 ms. In this embodiment, the credit timer is set for 60 ms because 60 ms is the maximum time to transfer a packet based on a maximum packet size of 1,500 bytes at the transmission speed of 200 Kbps. There are numerous variations in time periods the credit timer can be set at to reduce or eliminate the transmission delays.

In step 906, the upstream manager 515 checks if the credit timer expired. If the credit timer is expired, the upstream manager 515 returns to step 902 to issue a credit for the next wireless broadband router in the CSD. If the credit timer is not expired, the upstream manager 515 checks if a DONE message was received from the wireless broadband router 625 in step 908. If a DONE message was received, the upstream manager 515 returns to step 902 to issue a credit for the next wireless broadband router in the CSD. If a DONE message was not received, the upstream manager 515 returns to step 906.

Figure 10:
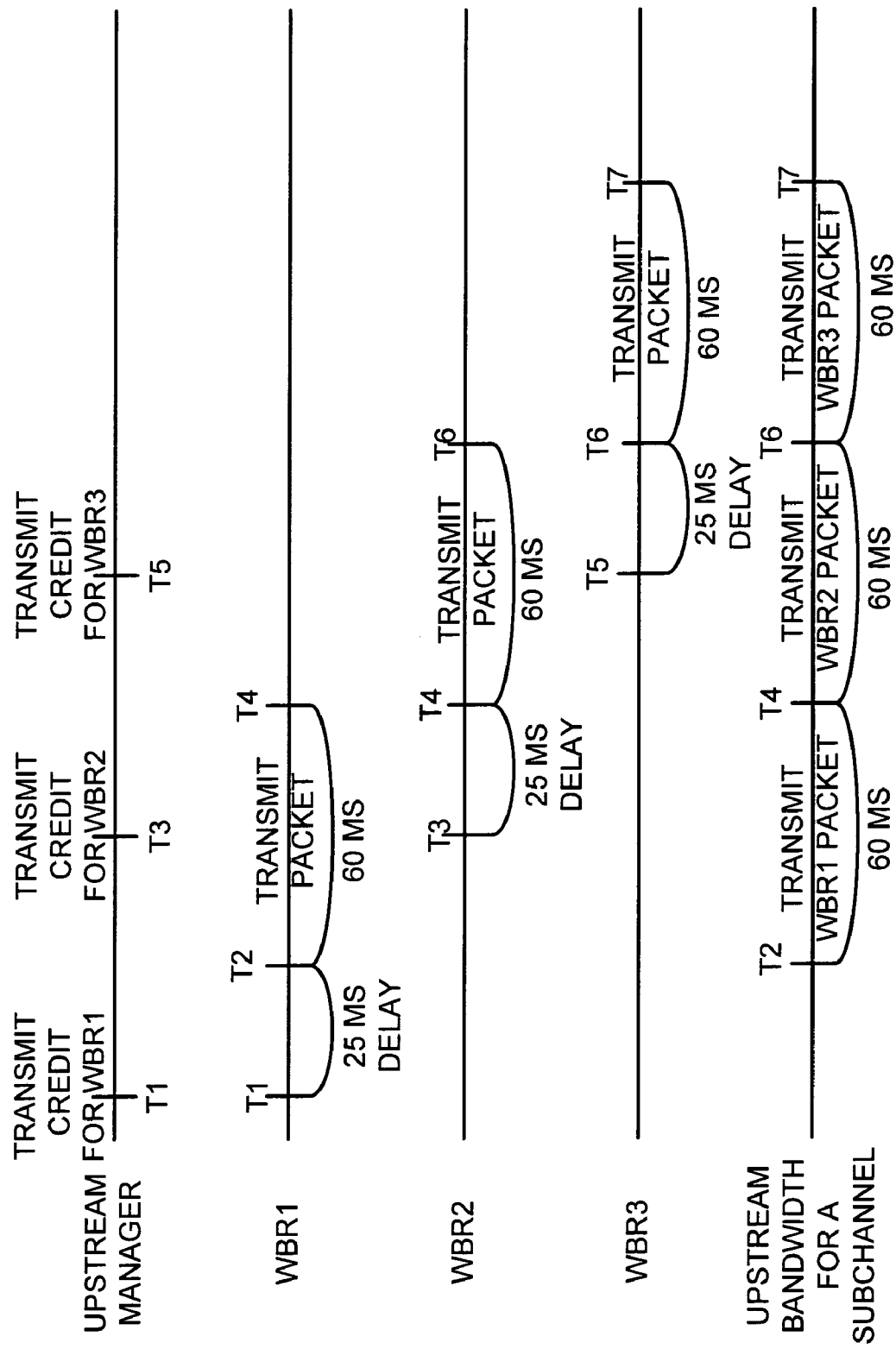
FIG. 10 is a time line for an upstream manager, three wireless broadband routers, and an upstream bandwidth for a channel in an example of the invention.

FIG. 10 depicts a time line for the upstream manager 515, three wireless broadband routers, and an upstream bandwidth for a channel in an example of the invention. In this example, the upstream manager 515 generates and transmits credits to three wireless broadband routers that access one channel in the upstream bandwidth from the wireless broadband routers to the upstream manager 515. At time T1, the upstream manager 515 generates and transmits a first credit for the first wireless broadband router 625 via the switch 510 and the downstream manager 520. The upstream manager 515 then sets a credit timer for the channel for 60 ms, which is the maximum time to transmit a packet. The first credit includes the IP address of the first wireless broadband router 625.

After approximately a 1 ms delay, the downstream manager 520 frames the credit into a Media Access control protocol, performs FEC and interleaving, and encapsulates the credit in UDP/IP, which delays the credit for approximately 12 ms. The first wireless broadband router 625 then receives the credit, performs FEC on the credit and interleaving, and queues a packet for the channel based on the credit, which results in total results in a delay of approximately another 12 ms. The total delay from the upstream manager 515 transmitting the credit to the wireless broadband router 625 transmitting the packet is 25 ms. From time T2 to T4, the first wireless broadband router 625 transmits the packet on the channel specified on the first credit on the upstream bandwidth to the upstream manager 515.

At time T3, the credit timer expires after 60 ms. The upstream manager 515 then generates and transmits a second credit for the second wireless broadband router via the switch 510 and the downstream manager 520. The upstream manager 515 again sets a credit timer for the channel for 60 ms. As described above, there is a 25 ms delay from transmitting the second credit to transmitting the packet. From time T4 to T6, the second wireless broadband router transmits the packet on the channel specified on the second credit on the upstream bandwidth to the upstream manager 515. At time T5, the credit timer expires after 60 ms. The upstream manager 515 then generates and transmits a third credit for the third wireless broadband router via the switch 510 and the downstream manager 520. The upstream manager 515 again sets a credit timer for the channel for 60 ms. As described above, there is a 25 ms delay from transmitting the third credit to transmitting the packet. From time T6 to T7, the third wireless broadband router transmits the packet on the channel specified on the third credit on the upstream bandwidth to the upstream manager 515.

FIG. 10 illustrates how the 25 ms delay can be eliminated, which improves maximization of the upstream bandwidth. In this embodiment, the credit timer is set for the maximum time to transfer a packet based on a maximum packet size of 1,500 bytes at the transmission speed of 200 Kbps. Unfortunately, the packets are not all the maximum size. Instead, many packet are smaller such as requests for web pages and acknowledgements. In one embodiment, over 90% of the upstream packets fit inside a single FEC block. Therefore, there may still be delays between transfer of packets.

In some embodiments, the maximum size of the packets are lowered to reduce delays. In one embodiment, the MTU is lowered from 1500 bytes to 576 bytes. The 576 bytes represents the minimum MTU permitted by IP standards. In this embodiment, the worst-case scenario with all the packets being at the minimum size at 576 bytes is 22% utilization, and the average case is slightly higher (estimated at 25%). The inter-packet delay goes from 30 ms to 23 ms, a 23% improvement. The best-case utilization stays at 100%. The inter-packet delay at this point is fixed at 23 ms, an improvement over the current situation of 73%.

In another embodiment, the credit timer is set at 5 ms to issue a credit for every 5 ms based on an observation that the wireless broadband router transmits for approximately 5 ms. Unfortunately, collisions between wireless broadband routers for the same channel occur. In this embodiment, the percentage of collisions is 5%, while the throughput with no collisions is 95%.

In one embodiment for adaptive predictive scheduling, the upstream manager 515 monitors the collision rate on each channel. If the collision rate exceeds a threshold value, the upstream manager 515 increases the rate of credit transmissions to decrease the rate of collisions. For example, a collision rate could be fixed at 1%. If the collision rate were to rise above that figure, the upstream manager 515 increases the rate of credit transmissions until the collision rate dropped back below 1%, which increases the delay between packets. In another embodiment, the collision rate is a FEC threshold.

Figure 11:
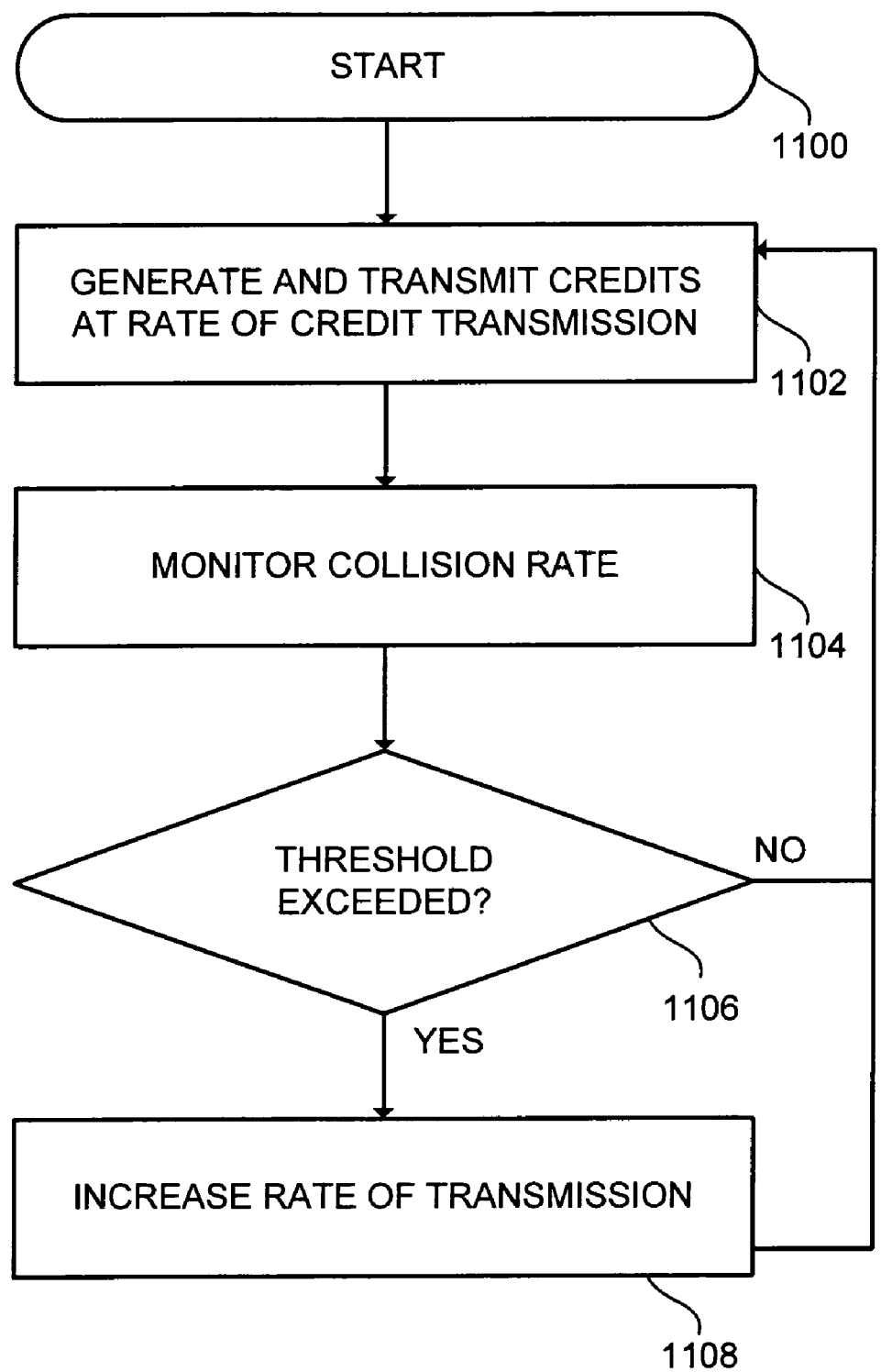
FIG. 11 is a flow chart of an upstream manager for adaptive predictive scheduling in an example of the invention.

FIG. 11 depicts a flow chart of the upstream manager 515 for adaptive predictive scheduling in an example of the invention. FIG. 11 begins in step 1100. In step 1102, the upstream manager 515 generates and transmits credits to the wireless broadband router 625 at a rate of credit transmissions. In step 1104, the upstream manager 515 monitors the collision rate. In step 1106, the upstream manager 515 checks if the collision rate has exceeded a threshold. If the threshold has not been exceeded, the upstream manager 515 continues to issue credits at the rate of credit transmissions. If the threshold has been exceeded, the upstream manager 515 increases the rate of credit transmissions based on the session history in step 1108 before returning to step 1102.

In one embodiment, the session history is stored as a formula for the rate of credit transmissions such as 1 credit for every 5 ms. The session history is represented as a moving average such as:

$$CT_N = (CT_{N-1})\alpha + (CT_{N-2})(1-\alpha)$$

where CT represents the rate of credit transmissions at a time period N;

and $\alpha$=the weighted average to apply for the last time period.

In one embodiment, the rate of credit transmissions, rate of collisions, and threshold collision value are on a per customer or wireless broadband router basis. This allows the upstream manager 515 to shape the upstream traffic by limiting the rates of credit transmissions. In some embodiments, the rate of credit transmissions is also based on the customer profile, time of day, day of week, or day of the year. A customer profile is any information associated with a customer such as address, age, position, type of customer, and billing information. This provides the broadband wireless system with a powerful mechanism to control which type of customers and when the customers have better throughput. This also allows the broadband wireless system to provide classes of service to different customers. Thus, a president of a company may get twice the rate of credit transmissions for employees to provide the president priority.

FIG. 12 depicts a table in the upstream manager 515 for shaping traffic in an example of the invention. FIG. 12 includes columns for customer IDs, wireless broadband router IDs, type of customer, rate of credit transmissions, collision rates, and the threshold for collision rate. In this embodiment, the upstream manager 515 monitors and stores the rate of credit transmissions, collision rates, and thresholds for collision rates for each customer or wireless broadband router. In this example, business customers receive higher rates of credit transmissions during the day, while residential customers receive higher rates of credit transmissions at night.

In another embodiment for predictive scheduling, the upstream manager 515 uses the information in the DONE message to schedule when credits are issued. The DONE messages include information such as the number of bytes sent and the number of packets left for the wireless broadband router to transfer. The upstream manager 515 specifically uses the number of packets left for the wireless broadband router to transfer to alter the size of a dedicated credit to match the time needed for the wireless broadband router to transfer the remaining packets. Thus, there is less dead air time over the upstream bandwidth.

Figure 13:
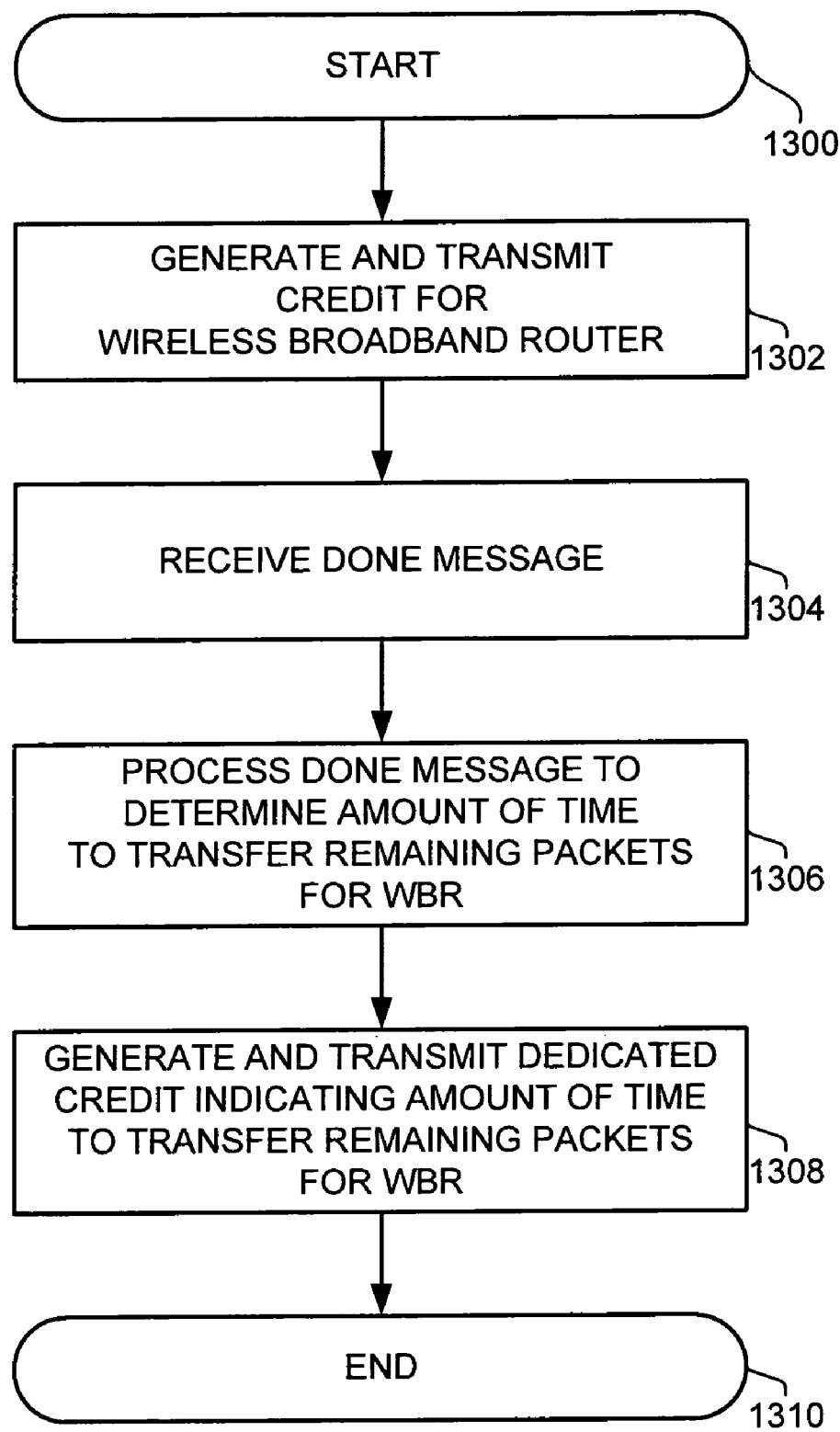
FIG. 13 is a flow chart of an upstream manager for DONE-based predictive scheduling in an example of the invention.

FIG. 13 depicts a flow chart of the upstream manager 515 for DONE-based predictive scheduling in an example of the invention. FIG. 13 begins in step 1300. In step 1302, the upstream manager 515 generates and transmits a credit for the wireless broadband router 625. In step 1304, the upstream manager 515 receives the DONE message from the wireless broadband router 625. In step 1306, the upstream manager 515 processes the DONE message to determine the amount of time for the wireless broadband router to transfer the remaining packets. In step 1308, the upstream manager 515 generates and transmits a dedicated credit for the wireless broadband router where the dedicated credit indicates the amount of time to transfer the remaining packets. FIG. 13 ends in step 1310.

In another embodiment, the DONE messages contain the remaining number of bytes to transfer for wireless broadband routers. The upstream manager 515 can then accurately predict the amount of time to transfer the remaining packets.

Figure 14:
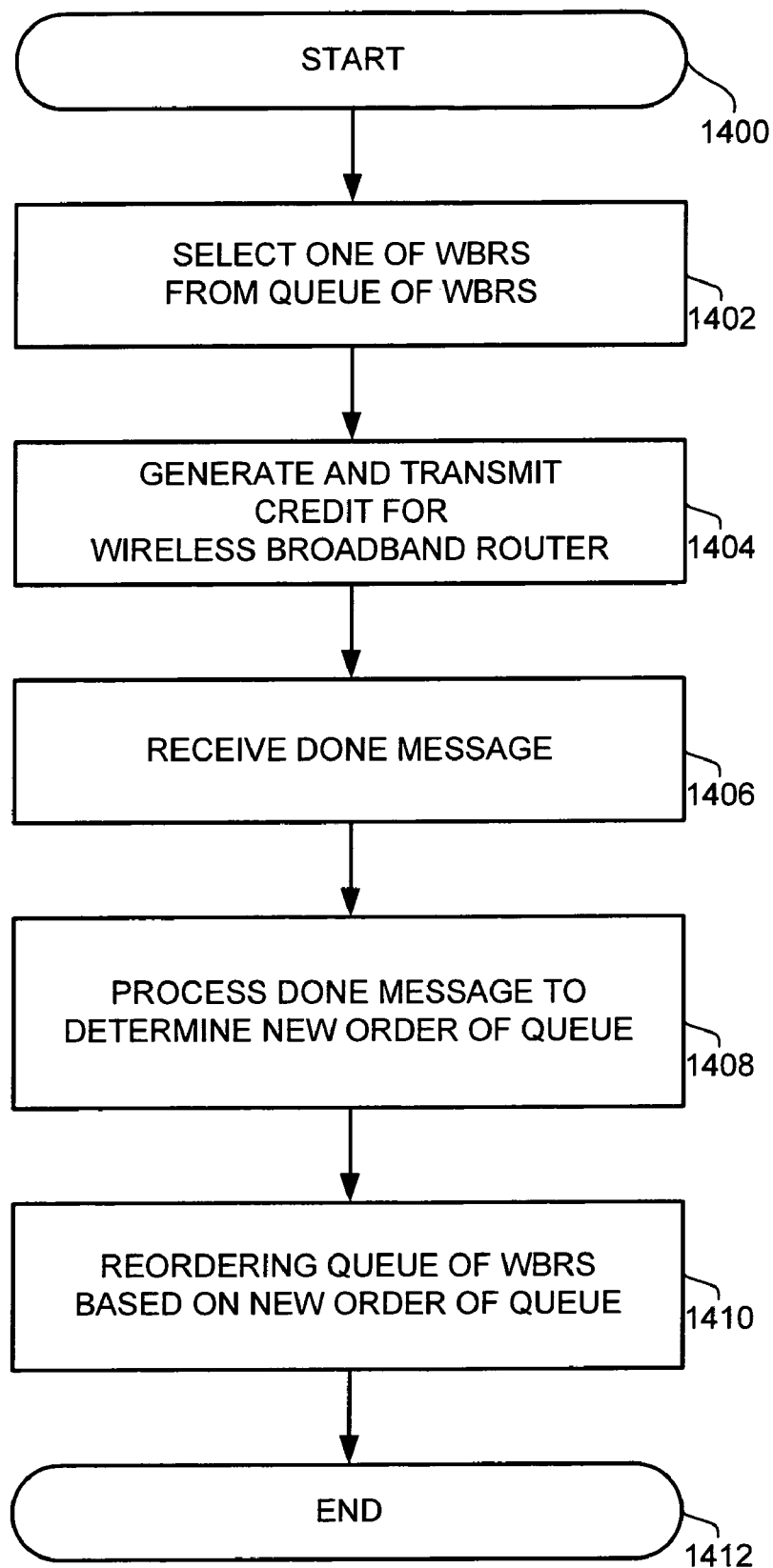
FIG. 14 is a flow chart of an upstream manager for reordering the queue based on DONE messages in an example of the invention.

In other embodiments, the upstream manager 515 uses the DONE messages to reorder the queue of available wireless broadband routers. Thus, wireless broadband routers with a high number of packets remaining to be transferred are issued credits before wireless broadband routers with no packets remaining to be transferred. FIG. 14 depicts a flow chart of the upstream manager 515 for reordering the queue based on DONE messages in an example of the invention. FIG. 14 begins in step 1400. In step 1402, the upstream manager 515 selects the wireless broadband router 625 from a queue of the wireless broadband routers. In step 1404, the upstream manager 515 generates and transmits a credit for the wireless broadband router 625.

In step 1406, the upstream manager 515 receives a DONE message. In step 1408, the upstream manager 515 processes the DONE message to determine a new order of the queue. In one embodiment, the upstream manager 515 determines the new order of the queue based on the session history as stated above. In another embodiment, the upstream manager 515 determines the new order of the queue based on a binary value in the DONE message indicating whether the last credit was used. In step 1410, the upstream manager 515 reorders the queue of wireless broadband routers based on the new order of the queue. FIG. 14 ends in step 1412.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

The invention claimed is:

1. A method of operating a wireless control system using wireless communications wherein the wireless communications comprise a plurality of channels and are shared between a plurality of wireless communication devices, the method comprising:
   generating and transmitting a first control message that allows first access to one of the channels for one of the wireless communication devices;
   receiving a termination message indicating termination of the first access;
   processing the termination message to determine an amount of time for a second access to the one of the channels for the one of the wireless communication devices; and
   generating and transmitting a second control message that allows the second access and indicates the amount of time.

2. The method of claim 1 wherein the wireless control system comprises an upstream manager.

3. The method of claim 1 wherein the first control message comprises a credit.

4. The method of claim 1 wherein the wireless communications are in a Multichannel Multipoint Distribution Service (MMDS) frequency range.

5. The method of claim 1 wherein the wireless communication devices comprise wireless broadband routers.

6. The method of claim 1 wherein the termination message indicates a number of packets remaining to be transmitted.

7. The method of claim 1 wherein the termination message indicates a number of bytes remaining to be transmitted.

8. A software product for operating a wireless control system using wireless communications wherein the wireless communication comprises a plurality of channels and are shared between a plurality of wireless communication devices, the software product comprising:
   wireless control system software operational when executed by a processor to direct the processor to generate and transmit a first control message that allows first access to one of the channels for one of the wireless communication devices, receive a termination message indicating termination of the first access, process the termination message to determine an amount of time for a second access to the one of the channels for the one of the wireless communication devices, and generate and transmit a second control message that allows the second access and indicates the amount of time; and
   a software storage medium operational to store the wireless control system software.

9. The software product of claim 8 wherein the wireless control system comprises an upstream manager.

10. The software product of claim 8 wherein the first control message comprises a credit.

11. The software product of claim 8 wherein the wireless communications are in a Multichannel Multipoint Distribution Service (MMDS) frequency range.

12. The software product of claim 8 wherein the wireless communication devices comprise wireless broadband routers.

13. The software product of claim 8 wherein the termination message indicates a number of packets remaining to be transmitted.

14. The software product of claim 8 wherein the termination message indicates a number of bytes remaining to be transmitted.

15. A wireless control system using wireless communications wherein the wireless communications comprise a plurality of channels and are shared between a plurality of wireless communication devices, the wireless control system comprising:
 a processor configured to generate and transmit a first control message that allows first access to one of the channels for one of the wireless communication devices, receive a termination message indicating termination of the first access, process the termination message to determine an amount of time for a second access to the one of the channels for the one of the wireless communication devices, and generate and transmit a second control message that allows the second access and indicates the amount of time; and
 an interface configured to transfer the first control message from the processor to the one of the wireless communication devices, transfer the termination message from the one of the wireless communication devices to the processor, and transfer the second control message from the processor to the one of the wireless communication devices.

16. The wireless control system of claim 15 wherein the wireless control system comprises an upstream manager.

17. The wireless control system of claim 15 wherein the first control message comprises a credit.

18. The wireless control system of claim 15 wherein the wireless communications are in a Multichannel Multipoint Distribution Service (MMDS) frequency range.

19. The wireless control system of claim 15 wherein the wireless communication devices comprise wireless broadband routers.

20. The wireless control system of claim 15 wherein the termination message indicates a number of packets remaining to be transmitted.

21. The wireless control system of claim 15 wherein the termination message indicates a number of bytes remaining to be transmitted.

22. A method of operating a wireless control system using wireless communications wherein the wireless communications comprise a plurality of channels and are shared between a plurality of wireless communication devices, the method comprising:
 selecting one of the wireless communication devices from a queue of the wireless communication devices;
 generating and transmitting a first control message that allows first access to one of the channels for the one of the wireless communication devices;
 receiving a termination message indicating termination of the first access;
 processing the termination message to determine an order of the wireless communication devices; and
 modifying the queue based on the order.

23. The method of claim 22 wherein the wireless control system comprises an upstream manager.

24. The method of claim 22 wherein the first control message comprises a credit.

25. The method of claim 22 wherein the wireless communications are in a Multichannel Multipoint Distribution Service (MMDS) frequency range.

26. The method of claim 22 wherein the wireless communication devices comprise wireless broadband routers.

27. The method of claim 22 wherein the termination message indicates a number of packets remaining to be transmitted.

28. The method of claim 22 wherein the termination message indicates a number of bytes remaining to be transmitted.

29. A software product for operating a wireless control system using wireless communications wherein the wireless communications comprise a plurality of channels and are shared between a plurality of wireless communication devices:
 wireless control system software operational when executed by a processor to direct the processor to select one of the wireless communication devices from a queue of the wireless communication devices, generate and transmit a first control message that allows first access to one of the channels for the one of the wireless communication devices, receive a termination message indicating termination of the first access, process the termination message to determine an order of the wireless communication devices, and modify the queue based on the order; and
 a software storage medium operational to store the wireless control system software.

30. The software product of claim 29 wherein the wireless control system comprises an upstream manager.

31. The software product of claim 29 wherein the first control message comprises a credit.

32. The software product of claim 29 wherein the wireless communications are in a Multichannel Multipoint Distribution Service (MMDS) frequency range.

33. The software product of claim 29 wherein the wireless communication devices comprise wireless broadband routers.

34. The software product of claim 29 wherein the termination message indicates a number of packets remaining to be transmitted.

35. The software product of claim 29 wherein the termination message indicates a number of bytes remaining to be transmitted.

36. A wireless control system using wireless communications wherein the wireless communications comprise a plurality of channels and are shared between a plurality of wireless communication devices, the wireless control system comprising:
 a processor configured to select one of the wireless communication devices from a queue of the wireless communication devices, generate and transmit a first control message that allows first access to one of the channels for the one of the wireless communication devices, receive a termination message indicating termination of the first access, process the termination message to determine an order of the wireless communication devices, and modify the queue based on the order; and
 an interface configured to transfer the first control message from the processor to the one of the wireless communication devices and transfer the termination message from the one of the wireless communication devices to the processor.

37. The wireless control system of claim 36 wherein the wireless control system comprises an upstream manager.

38. The wireless control system of claim 36 wherein the first control message comprises a credit.

39. The wireless control system of claim 36 wherein the wireless communications are in a Multichannel Multipoint Distribution Service (MMDS) frequency range.

40. The wireless control system of claim 36 wherein the wireless communication devices comprise wireless broadband routers.

41. The wireless control system of claim 36 wherein the termination message indicates a number of packets remaining to be transmitted.

42. The wireless control system of claim 36 wherein the termination message indicates a number of bytes remaining to be transmitted.

* * * * *